United States Patent [19]

Kaul et al.

[11] 4,363,094

[45] Dec. 7, 1982

[54] COMMUNICATIONS PROCESSOR

[75] Inventors: Pradeep Kaul; Daniel Wendling, both of Rockville; Harold Ford, Germantown; Deepak Muzamder, Gaithersburg, all of Md.; Christopher Newport, Annandale, Va.

[73] Assignee: M/A-COM DDC, Inc., Germantown, Md.

[21] Appl. No.: 156,451

[22] Filed: Jun. 4, 1980

Related U.S. Application Data

[63] Continuation of Ser. No. 865,655, Dec. 29, 1977.

[51] Int. Cl.³ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,104,332 | 9/1963 | Yourke et al. | 307/88.5 |
| 3,245,043 | 4/1966 | Gaffney | 364/200 |
| 3,336,582 | 8/1967 | Beausuleil | 364/200 |
| 3,480,914 | 11/1969 | Schlaeppi | 340/172.5 |
| 3,508,206 | 4/1970 | Norberg | 340/172.5 |
| 3,629,854 | 12/1971 | Hauck | 364/200 |
| 3,699,529 | 10/1972 | Beyers et al. | 340/172.5 |
| 3,742,148 | 6/1973 | Ledeen et al. | 370/84 |
| 3,766,530 | 10/1973 | Ito | 340/172.5 |
| 3,796,992 | 3/1974 | Nakamura et al. | 340/147 LP |
| 3,806,885 | 4/1974 | Moore | 340/172.5 |
| 3,810,114 | 5/1974 | Yamada et al. | 364/200 |
| 3,831,151 | 8/1974 | Jones, Jr. et al. | 340/172.5 |
| 3,832,689 | 8/1974 | Means et al. | 340/147 LP |
| 3,832,692 | 8/1974 | Henzel et al. | 340/172.5 |
| 3,919,483 | 11/1975 | Gindi | 364/200 |
| 3,932,841 | 1/1976 | Deerfield et al. | 364/200 |
| 3,934,232 | 1/1976 | Curley | 364/200 |
| 3,997,896 | 12/1976 | Cassarino, Jr. | 364/200 |
| 4,000,485 | 12/1976 | Barlow et al. | 364/200 |
| 4,004,283 | 1/1977 | Bennett | 364/200 |
| 4,016,548 | 4/1977 | Law et al. | 364/200 |
| 4,028,663 | 7/1977 | Royer et al. | 364/900 |
| 4,030,075 | 6/1977 | Barlow | 340/172.5 |
| 4,034,347 | 7/1977 | Probert | 364/200 |
| 4,041,472 | 8/1977 | Shah et al. | 364/900 |
| 4,047,158 | 9/1977 | Jennings | 364/900 |
| 4,058,672 | 11/1977 | Crager et al. | 178/3 |
| 4,058,838 | 11/1977 | Crager et al. | 358/257 |
| 4,059,851 | 11/1977 | Nutter, Jr. | 364/200 |
| 4,065,809 | 12/1977 | Matsumoto | 364/200 |
| 4,096,567 | 6/1980 | Millard | 364/200 |
| 4,096,572 | 6/1978 | Namimoto | 364/200 |
| 4,130,865 | 12/1978 | Heart et al. | 364/200 |
| 4,148,011 | 4/1979 | McLagan | 340/147 LP |

FOREIGN PATENT DOCUMENTS

| | | |
|---|---|---|
| 1137812 | 12/1968 | United Kingdom . |
| 1199023 | 7/1970 | United Kingdom . |
| 1311183 | 3/1973 | United Kingdom . |
| 1372228 | 10/1974 | United Kingdom . |
| 1410838 | 10/1975 | United Kingdom . |

OTHER PUBLICATIONS

Heart et al., "A New Minicomputer/Multiprocessor for the ARPA Network", AFIPS Conference Proceeding, 1973, pp. 529-537.

Bass, "A Peripheral-Oriented Microcomputer System", IEEE Proceedings, vol. 64, No. 6, Jun. 1976.

Newport et al., "Communication Processors", IEEE Proceedings, vol. 60, pp. 1321-1332, Nov. 1972.

*Primary Examiner*—Gareth D. Shaw
*Assistant Examiner*—David Y. Eng
*Attorney, Agent, or Firm*—Pollock, Vande Sande & Priddy

[57] ABSTRACT

A flexible, modular communications processor is disclosed comprised of a plurality of microprocessors. A demand assigned bus is provided to couple the microprocessors through an arbitrator to an information storage and retrieval device. Each of the microprocessors comprises a conventional integrated circuit microprocessor, associated local memory, transmitters and receivers for coupling information to and from the bus and bus access circuitry, cooperating with the arbitrator to allocate the bus resource. Communication input/output is handled by a plurality of microprocessors configured as line processors, each coupled to its associated interface switch, which, in turn, is coupled to modems or other input/output devices. A background or executive microprocessor is included to manage system configuration and react to failures. The common bus actually comprises a pair of buses and modularity is provided by allowing the number of line processors to be changed by inserting or deleting circuit cards without affecting the operation of other line processors. The communications processor may be redundantly configured by providing an additional arbitrator and additional executive or background processor and information storage and retrieval device such that all common equipment is redundant. On the other hand, the processor can be configured for load sharing wherein a plurality of line processors and one of the executive or background processors operate on one bus under control of an arbitrator operating to and from one of the information storage and retrieval devices, while the other executive or background processor cooperates with a different group of line processors over the other bus under control of the other arbitrator to and from the other information storage and retrieval device.

43 Claims, 24 Drawing Figures

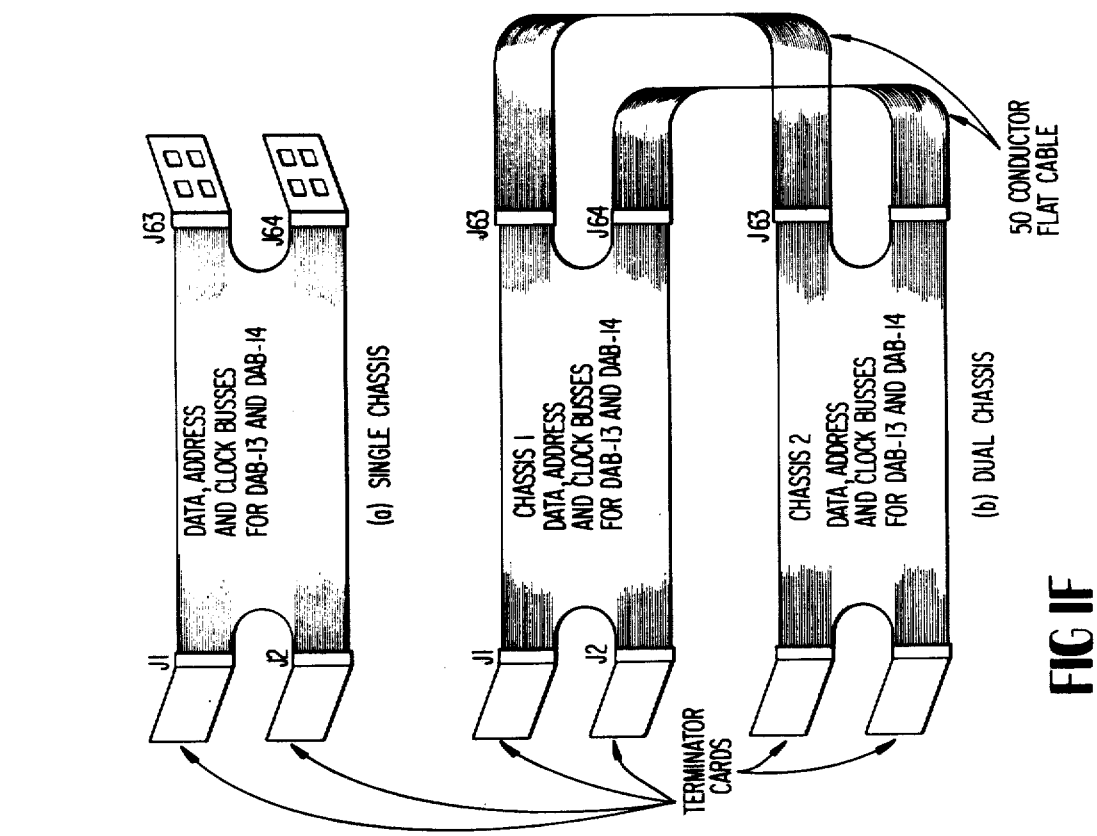
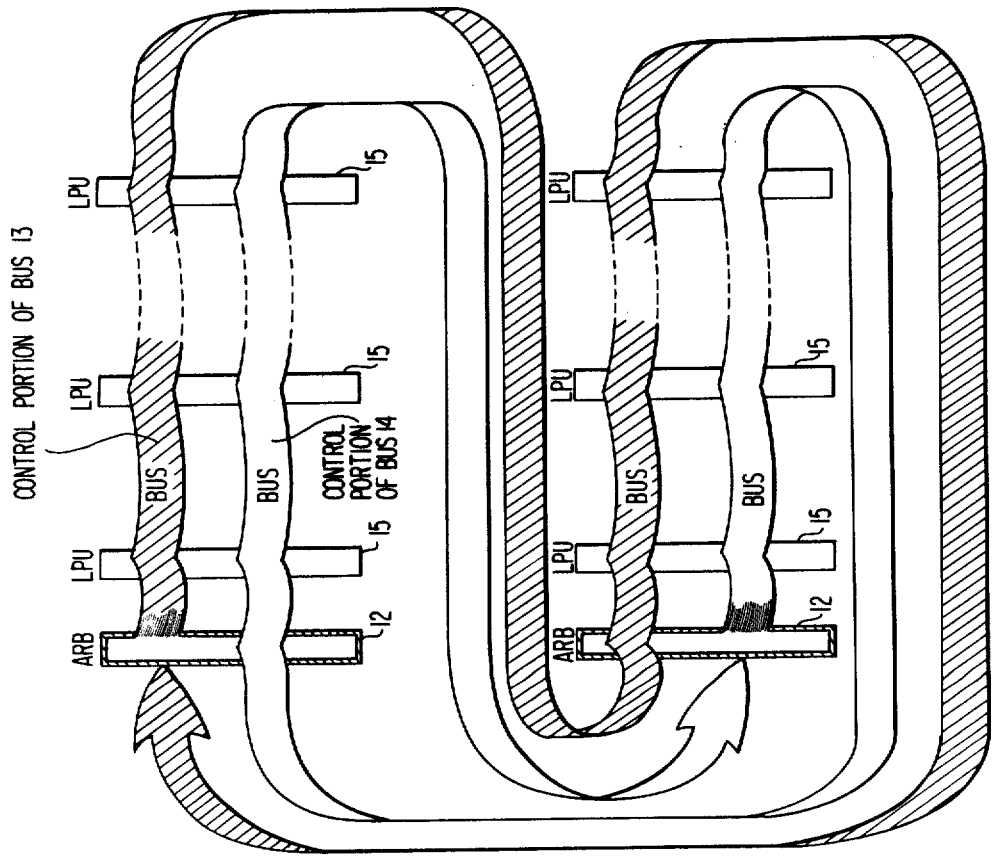
FIG 1F
FIG 1E

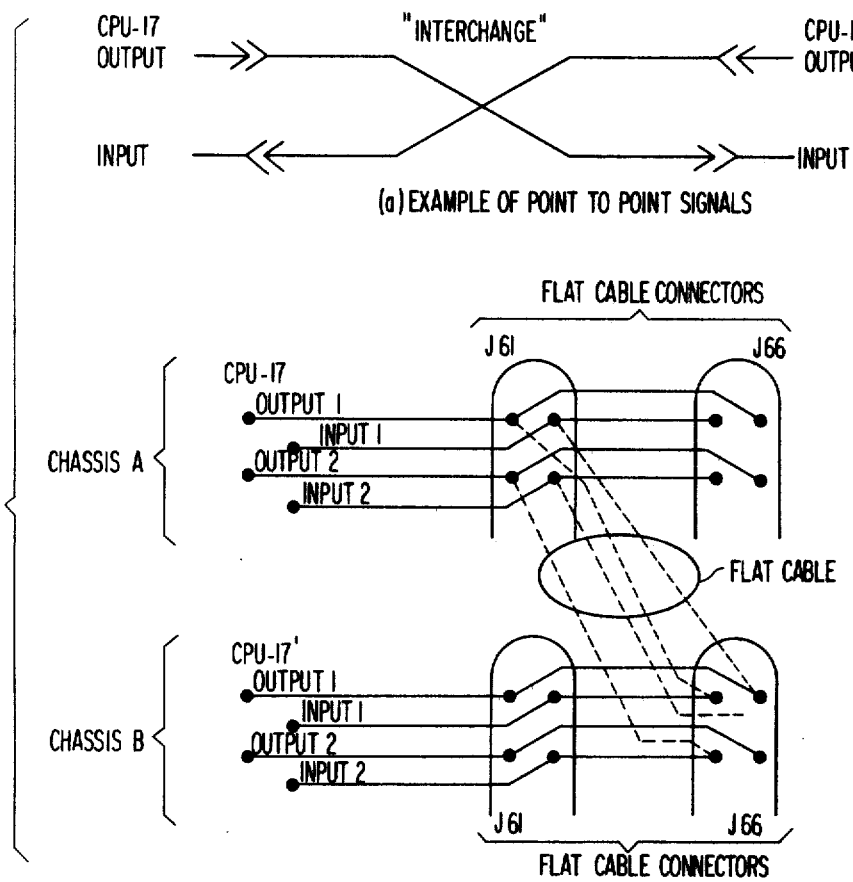
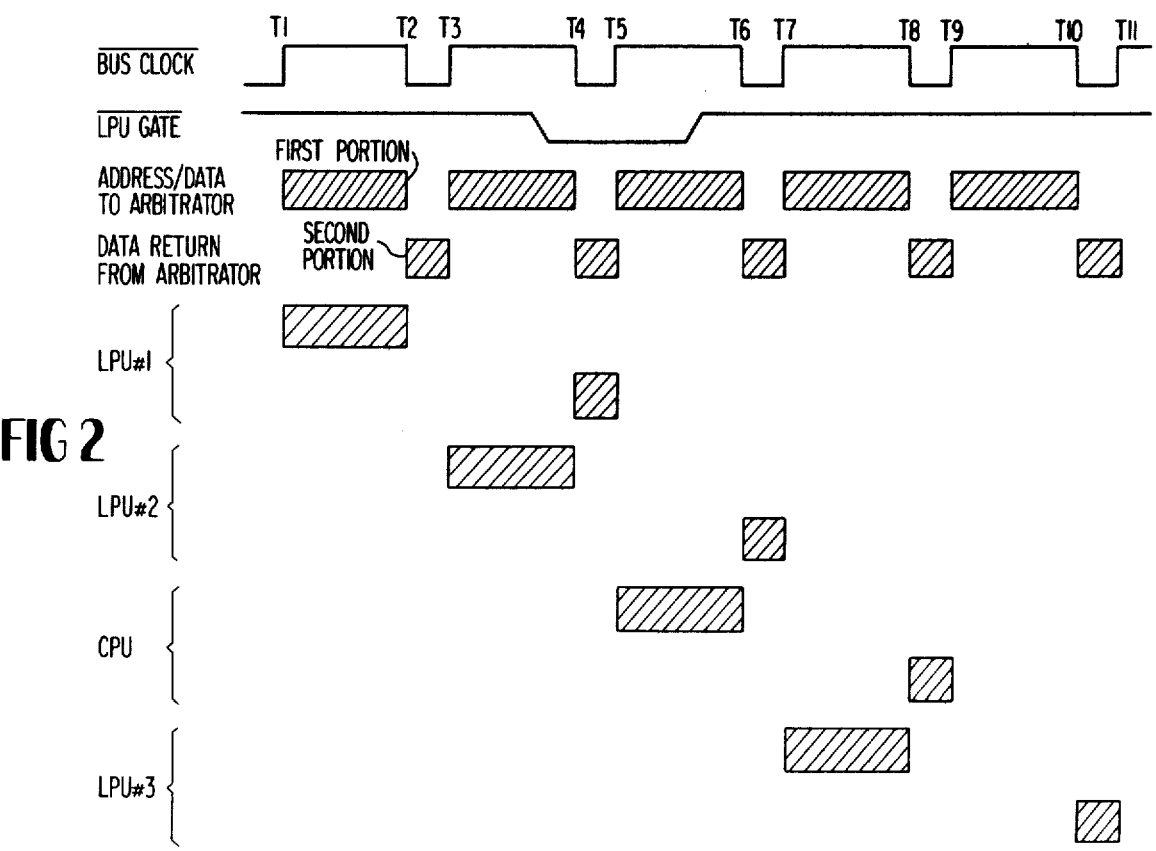

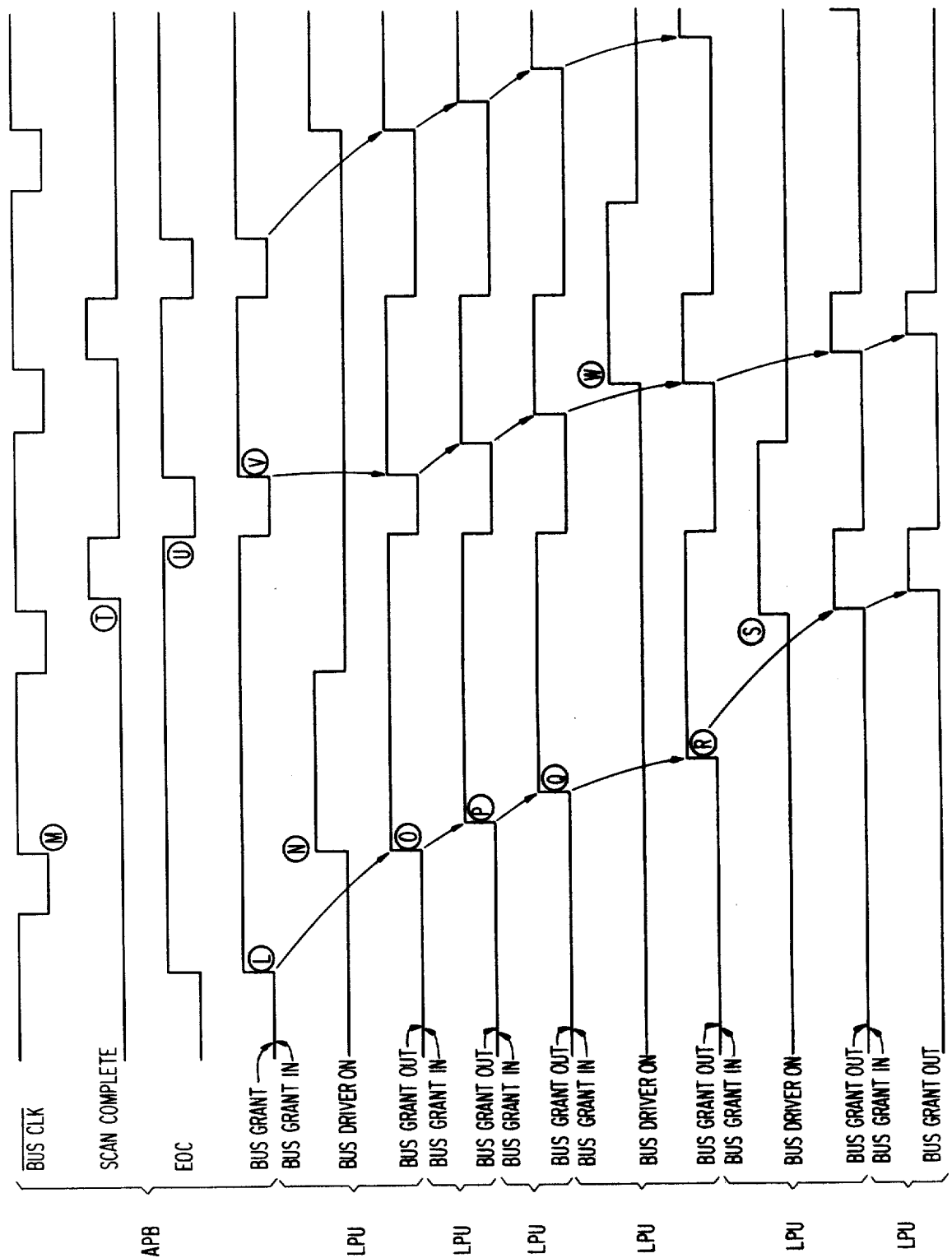

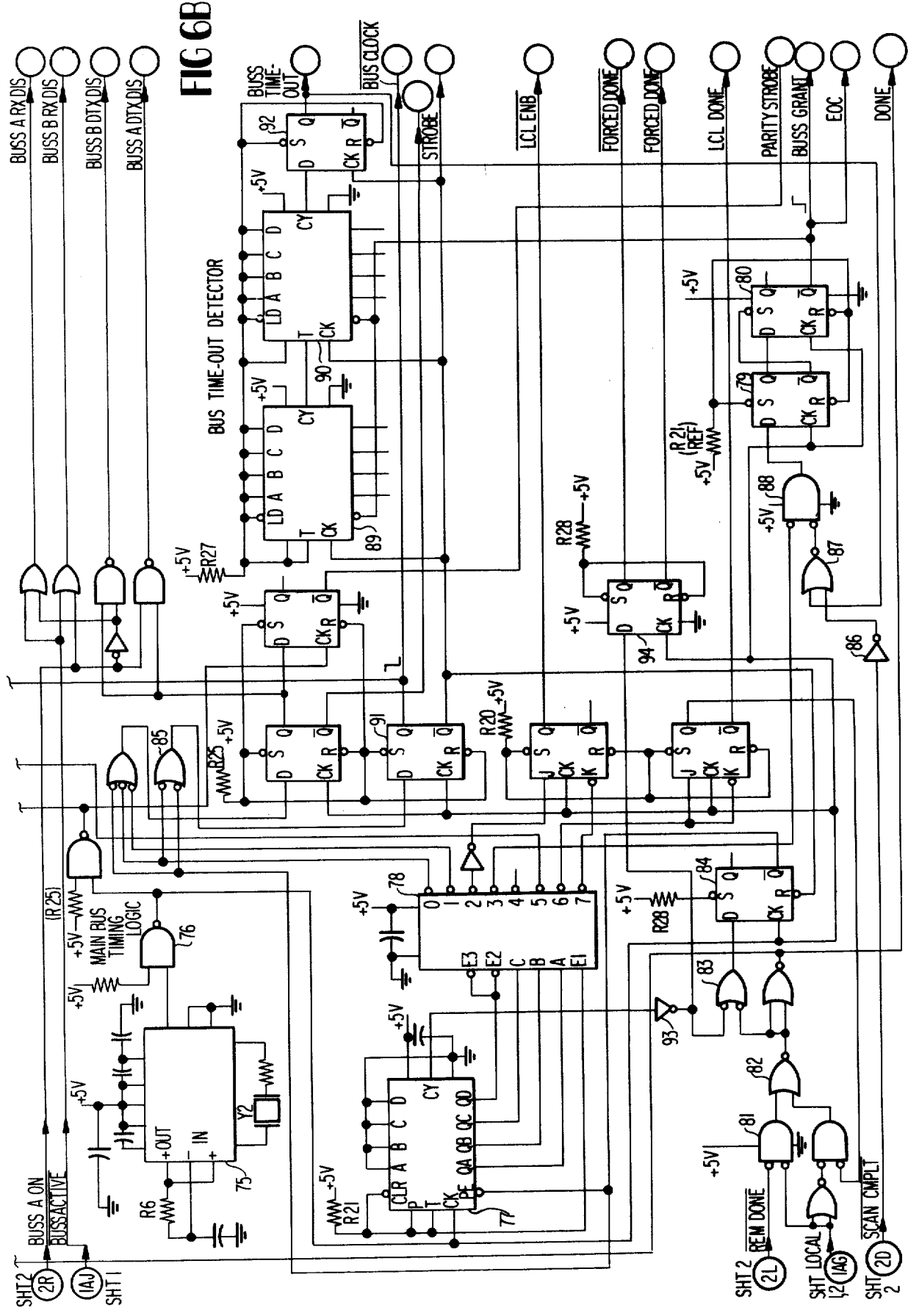

-------> INDICATES SWITCHED POSITION TO ROUTE LINES FROM FAILED LPU
———————> INDICATES NORMAL POSITION FOR DATA FLOW

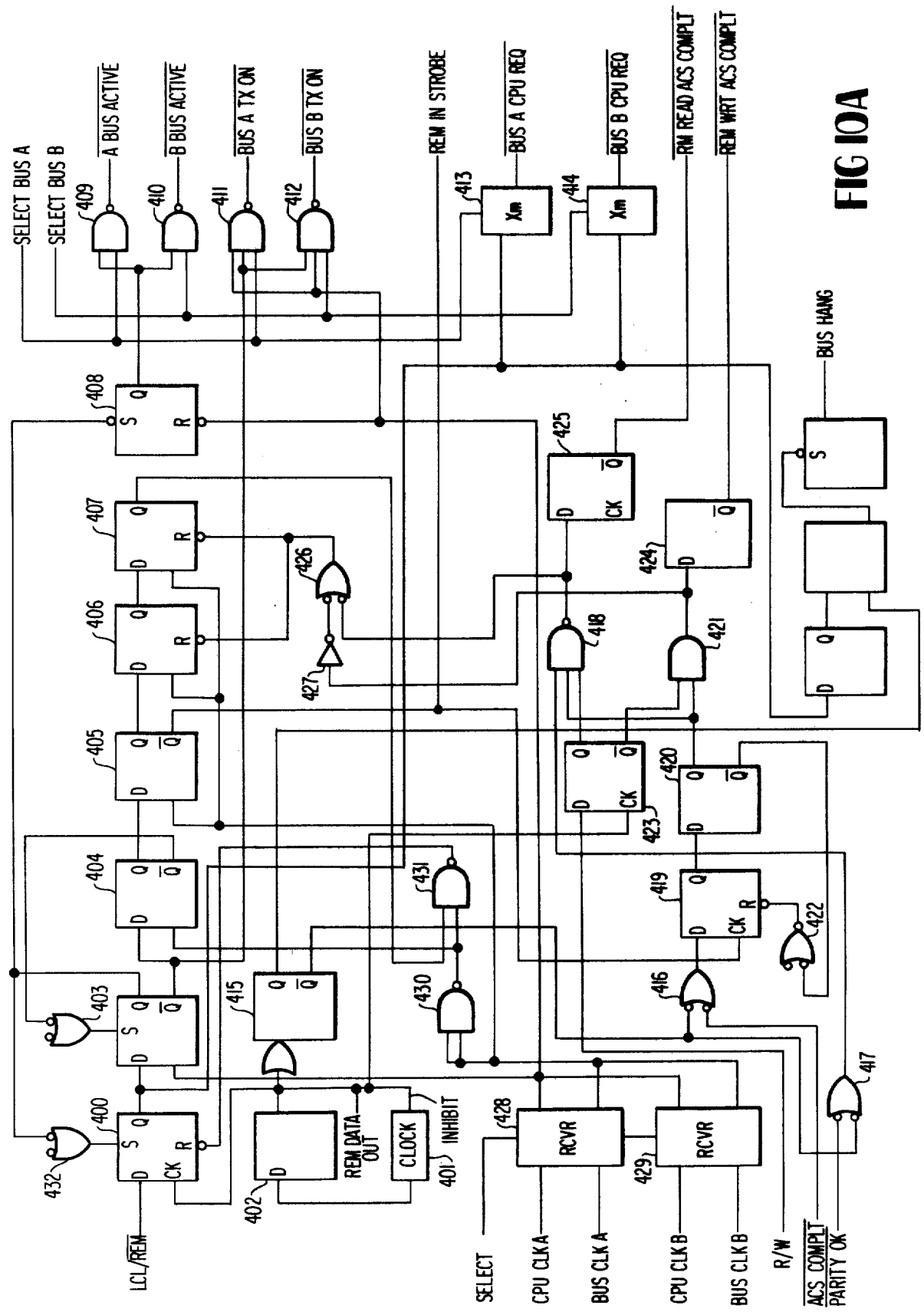

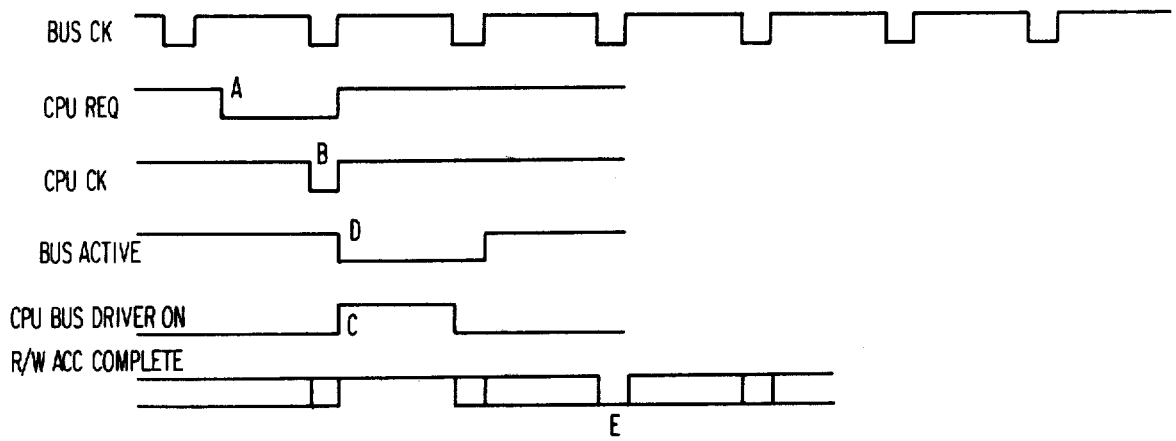

- A  CPU REQUESTS AN ACCESS TO THE DAB.
- B  AMU RESPONDS WITH A $\overline{\text{CPU CLOCK}}$ ALLOWING THIS CPU ACCESS TO THE DAB.
- C  THE CPU ANNOUNCES $\overline{\text{BUS ACTIVE}}$ ON THE DAB.
- D  ITS BUS DRIVERS ARE ON FOR THE ACCESS DURING THIS PERIOD.
- E  THE RESULTS OF THIS ACCESS APPEAR FROM THE AMU DURING THIS PERIOD.

IF THE ACCESS WAS FOR READ (HIGH DURING (6) AS SHOWN), THEN THE DATA WOULD RETURN DURING (5) ABOVE. IF THE ACCESS WAS A "WRITE" THE INTERVAL DURING (6) ABOVE WOULD BE LOW AND IF THE WRITE WAS SUCCESSFUL, (5) WOULD BE LOW. IF THERE WAS A PARITY ERROR DURING A READ OR WRITE DETECTED IN THE AMU (5) WOULD BE HIGH.

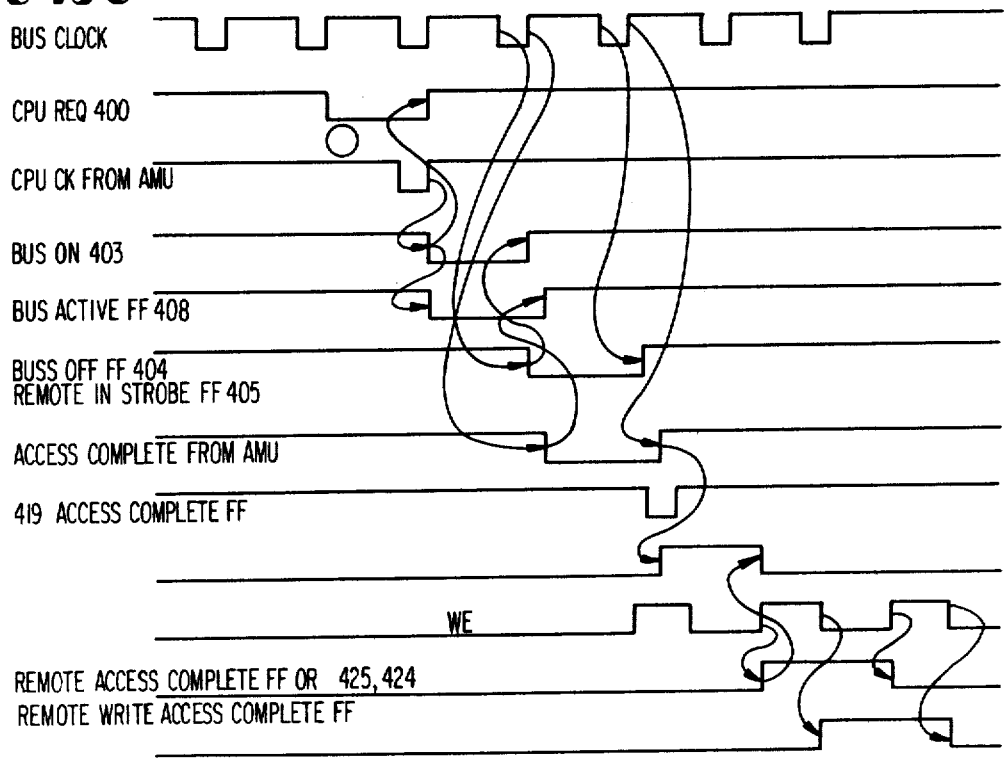

COMMUNICATIONS PROCESSOR

This is a continuation of application Ser. No. 865,655, filed Dec. 29, 1977.

FIELD OF THE INVENTION

The invention relates to communication processors which can perform the functions of data concentration, multiplexing, translation, packet switch, and/or message switching which is flexible and provides for modular growth.

BACKGROUND OF THE INVENTION

Since the rise of the data communication industry offering communication facilities specially tailored for the transfer of information in digital form, a class of computers can be identified which is especially adapted for functions related to the communication of data in digital form. For example, the Crager et al U.S. Pat. Nos. 4,058,672 and 4,058,838, both disclose packet switched data communication systems as well as processors specially adapted for performing functions required in such systems. The present invention is an improvement of these and other communication oriented processors.

Taking as an example the above-referenced patents, the functions typically required of the communication processor includes those of:

(1) collecting bit serial information received from one or more communication lines and forming a group of such bits (for example, a byte);

(2) storing the collected bytes and collecting additional bytes;

(3) in the course of collecting the first or subsequent bytes, performing any necessary code translation or parity or other type of data checking;

(4) when a group of bytes are collected (for example, a packet) processing them and then outputting the packet through another port for transmission to another communication processor or to the data recipient.

While the performance of these functions is, in and of itself, conventional in the art, the function of the communication processor is to perform the foregoing function simultaneously for a large number of communication lines over which data may be received, to do so efficiently as the information transfer rate varies as a function of time, and do so in a manner in which the capacity of the communication processor can be changed (usually increased) due to the addition of new communication lines and perform the foregoing functions in a reliable and maintainable system, which has the further characteristic of being reasonable in cost. Although the example given above has been that of a node or a switch in a packet data transmission system, those skilled in the art will understand that the same apparatus should also be capable of concentration, multiplexing and message switching.

It is, of course, a trivial solution to the problem of efficient growth in a node in a data switching system, to provide a processor having capacity equal to the largest capacity then foreseen for the particular node. Not only is the solution trivial but is also impractical, especially where when initially installed the node does not require the amount of processing power ultimately foreseen.

A particularly effective solution for this problem is to provide for processing power in increments, but a pressing problem raised by this solution is that of integrating each new increment of processing power into the extant system in a manner which does not detract from the efficiency of the already-available processing power. This is a problem inherent in any distributed computing system and the solution of the problem disclosed herein is applicable not only to communication processors but to any distributed computer.

The patents to Deerfield (U.S. Pat. No. 3,932,841) and Nutter (U.S. Pat. No. 4,059,851) provide an arrangement in which information may be transferred over a common bus coupling major components of a digital computer system. In both systems, a priority scheme is implemented by passing a control signal along a serial path from a source of the signal to the highest priority user and from that user to a lower priority user, and so on. The signal, received at a user, is only passed on after the user accesses the bus. While these arrangements should be quite effective, they do admit of substantial improvement. In a system which may be limited by bus capacity, saving the time which would be otherwise wasted between the completion of one access by a user to allow the control signal to trickle down to another user, can make an enormous difference.

Furthermore, Deerfield explicitly, and Nutter implicitly teach that a bus user can use the bus for an unlimited time without relinquishing access. While this may be workable in a generalized digital computer environment, in the environment of a communication processor, it is not a viable technique.

It is therefore one object of the present invention to provide a flexible modular distributed computer which is capable of allocating a common resource among a variable number of processor users of that resource. It is a more particular object of the present invention to provide a distributed computing system in which access to a common memory resource is distributed over a demand assigned bus which provides for equal availability of the bus to a variable number of processor users. A further object of the invention is to provide for the distribution of the demand assigned bus in a fashion which does not waste bus resource capacity in making the decision as to which processor user will next have access to the bus. It is a further object of the present invention to provide for a distributed computing system in which a plurality of processor users access a common memory over a demand assigned bus and in which bus resource is not wasted in waiting for the common memory to complete an information transfer cycle. It is another object to provide a demand assigned bus distribution system in which a user gaining access is only permitted to use the bus for a single transfer, must thereafter relinquish the bus and can only regain the bus after each other user has accessed the bus or refused access.

It is still another object of the invention to provide a communication processor having a plurality of line processors and at least one executive or background processor, in which each of the line processors communicates with a common memory over a demand assigned bus in an effective and efficient manner. It is another object of the invention to provide for a variable number of line processors, and the capability of adding additional line processors without interrupting the operation of the processor.

It is still another object of the invention to provide a communication processor including a variable number of line processors and common equipment including a memory, demand assigned bus, an executive or background processor in which the common equipment can be configured in fully redundant form. It is another object of the invention to provide a system of the foregoing type in which the executive or background processor can override each of the line processors and require them to operate on one of the two buses.

It is yet another object of the invention to provide a communication processor including a plurality of line processors, one for each communication or groups of communication lines in which the line processors are coupled to the communication lines over interface switches and in which an executive or background processor has the capability of removing any identified line processors.

SUMMARY OF THE INVENTION

These and other objects of the invention are met by the communication processor disclosed herein having the characteristics of high processing power, large memory capacity, high reliability and low cost.

One of the important advantages of the invention derives from reliance entirely on microprocessors for intelligence and the elimination of main frame or even minicomputers. Of course, a significant aspect of the invention is the integration of the microprocessors into a smoothly functioning entity requiring little or no supervision among a plurality of independent microprocessors.

The characteristics of the invention are achieved by a unique arrangement for distributing capacity of the demand assigned bus. Bus capacity is distributed on a demand basis so that only those microprocessors requiring access to the bus are in contention for bus capacity. At the same time, however, the decision between the contending microprocessors for bus access is usually determined prior to the time of bus access, so that the bus access of one microprocessor user is followed directly by the access of the next microprocessor user. Furthermore, since the bus is the link between the microprocessors and the common memory, and since memory access normally is a cyclical operation in which an address is provided (and perhaps data for a write operation) and the operation (either read or write) takes a given time unit, memory accesses on the bus are pipelined so that bus resource is not wasted during actual memory access. This pipelining allows statistical multiplexing of the bus between the contending processors. More particularly, the arbitrator, which takes part in control over bus access, distributes a bus clock to all microprocessor users which bus clock has two distinctive portions making up a bus clock cycle. During one portion of the bus clock cycle, the bus is employed for information flow to the memory, and in the other distinctive portion of the bus clock, the bus is used for information flow from the memory. However, a user who, for example, places an address on the bus during the first distinctive portion of the bus clock, is not entitled to use of the bus for the contiguous second portion of the bus clock. Rather, that portion of the bus clock is reserved for the prior user.

Contention among the microprocessor users for bus capacity is resolved by joint cooperation of the arbitrator and the bus access circuitry associated with each of the microprocessor users. This concept of distributed control improves reliability and also allows the cost to be distributed. More particularly, the arbitrator initiates a scan in order to distribute bus capacity by generating a signal called BUS GRANT. Unlike many of the other control signals, BUS GRANT is not coupled to all of the microprocessor users, but instead is effectively coupled to only a single one of the microprocessor users. This microprocessor may accept access to the bus by placing information on the bus during the first distinctive portion of the bus clock. Simultaneously, with such operation, if access is accepted, the microprocessor bus control circuitry generates a replica of the BUS GRANT signal and couples it to an adjacent microprocessor. On the other hand, if the bus access is not required, a microprocessor receiving BUS GRANT will immediately couple a replica of BUS GRANT to an adjustment microprocessor. The BUS GRANT signal then ripples through the microprocessors, in a daisy chain fashion, during the time of any one particular access, and normally reaches a second microprocessor user who desires access to the bus before the first access is completed. In this fashion, on the next first distinctive portion of the bus clock, the second microprocessor user employs the bus resource.

Those microprocessors contending for bus access in the described fashion are each line processors whose responsibility is the management and data flow from one or more communication lines. In addition, an executive or background microprocessor is provided for overall management and intelligent response to failures.

In order for the executive or background processor to communicate with the line processors, that processor, too, requires access to the bus. The executive or background processor effectively "steals" bus clock cycles, when required, by transmitting a bus request to the arbitrator. The arbitrator will honor that request at most, on every other bus clock, to insure that the executive or background processor cannot receive more than 50% of the bus accesses. In order to effectively steal a bus clock cycle, when requested by the executive or background processor, the arbitrator generates an additional signal called LPU GATE, which is distributed to all of the line processors. This gate inhibits all line processors from responding to the bus clock, thus effectively preventing any of the line processors from using the bus during the bus cycle granted to the executive or background processors.

To allow for modular growth of the communication processor, the number of line processors may be increased or decreased in a simple and effective manner without requiring changes to the bus granting circuitry already in place. Since the arbitrator must be informed as to when each scan has been completed, independent of the number of line processors, each of the line processors returns, over a common line, a complete signal to the arbitrator in a wired OR configuration. When a line processor does not require access to the bus, or when it already has had an access in any particular scan, the complete signal is allowed to go high. Only when each of the line processors on the bus returns a high signal, does the arbitrator generate a new BUS GRANT signal to begin the scan once again. In order to prevent a failure from immobilizing the processor, however, the generation of each BUS GRANT signal by the arbitrator initiates a timer, at the arbitrator, which times out a predetermined period. At the completion of the period (which is arranged to be much longer than the scan time of even the largest processor configuration) the arbitrator will automatically generate a new BUS GRANT signal to initiate a new scan.

The arbitrator also provides the link between the demand assigned bus and the memory resource. For information flowing to the memory resource, the link is not buffered, but the arbitrator responds to a BUS ACTIVE signal received from a microprocessor user placing data on the bus, to allow the information on the bus to be latched into the memory resource circuitry. The arbitrator also generates, for data flowing to the microprocessor users, an ACCESS COMPLETE signal in the absence of a parity error detected at either the arbitrator or the memory resource. The ACCESS COMPLETE signal, when received at a microprocessor user, is employed to allow the information on the bus to be latched into the microprocessor for use.

Since the BUS GRANT signal is coupled in daisy chain fashion through the plurality of microprocessor users then connected in the system, some means must be arranged for identifying at any microprocessor user, its predecessor so that it can properly accept the BUS GRANT signal therefrom. At the same time, however, the arrangement is required to allow additional microprocessors to be inserted, thus increasing the number of microprocessors in use. To satisfy these requirements, each microprocessor can "look" upstream to identify its nearest neighbor and to accept the BUS GRANT signal from that neighbor alone. To make this determination, each microprocessor provides a CARD PRESENT signal whenever it is enabled for operation. The CARD PRESENT signal of each microprocessor is coupled to a plurality of potential microprocessor locations (i.e., card slots) on the bus. A priority encoder at each microprocessor determines the source of the closest CARD PRESENT signal and controls a multiplexer to pass the BUS GRANT signal from that microprocessor alone to the bus access circuitry.

To provide for effective operation with redundant buses, apparatus is required, at each microprocessor, to determine upon which bus information will be transmitted and received. Initially, each microprocessor is locally empowered to make this determination so that when data is to be transmitted, only one of two sets of transmitters will be energized, and when data is received, only a single one of two receivers will be responded to. At the same time, however, the background or executive processor has the capability of forcing one or all of the line processors to operate at a selected one of the two buses. For this, or other reasons, a microprocessor may be required to switch from one bus to another. Because of the daisy chain coupling of BUS GRANT signals, however, bus switching must be synchronized with the bus granting procedures on both of the buses. Each time an arbitrator generates a BUS GRANT signal, it also generates an END OF CYCLE signal which, in contrast to the BUS GRANT signal, is coupled to each of the microprocessors. Each of the microprocessors includes a bi-stable device such as a flip-flop which is associated with each bus. Each flip-flop responds to a selection signal from either the local microprocessor, or the executive or background processor. However, the flip-flops are clocked by the END OF CYCLE signal such that they can only change state upon receipt of END OF CYCLE. Accordingly, a line processor cannot leave a bus until END OF CYCLE is received on that bus and it cannot enter another bus until END OF CYCLE is received from the bus to be entered.

As mentioned above, redundancy, regardless of communication processor configuration, is provided by the redundant demand assigned buses. The inventive microprocessor can be configured to include multiple central memories, multiple arbitrators and multiple executive or background processors. In such a configuration, all the common equipment is provided in multiple and one set can be standby for redundancy purposes. However, one aspect of the flexibility of the present system is that the buses can be employed for load sharing purposes rather than redundancy. Thus, for example, one of the central memories, one of the arbitrators, and one of the demand assigned buses can operate with a group of the line processors and one of the executive or background processors as, in effect, a stand-alone system, while the other central memory resource, other arbitrator, other demand assigned bus and other executive or background processor can operate with another group of line processors as a second stand-alone system. To provide for redundancy among the line processors themselves, a more efficient one for N redundancy is provided. That is, a single backup line processor is provided as a redundant spare for a number of line processors. To implement this arrangement, an interface switch is interposed between each line processor and an associated modem or modems. A plurality of interface switches may be coupled together, and all are controlled by an executive or background processor. Normally, one of the interface switches and its associated line processor are available as a spare, that is, not in use. If the executive or background processor detects a failed line processor, it can effectively eliminate the failed line processor by controlling the interface switch associated with the failed line processor, the interface switch associated with the spare LPU and the spare LPU itself. The path from the interface switch to the failed line processor is opened, and the interface switch instead is coupled to the interface switch associated with the spare line processor which is started into operation by the executive or background processor. Thus, data flowing to or from the modem is coupled through two interface switches to the spare LPU to effectively remove the failed LPU. At the same time, the executive or background processor can provide a maintenance signal to indicate that the failed LPU should be replaced.

Insofar as the invention is concerned, the line processors are treated alike. However, those skilled in the art will understand that line processors of identical hardware can be programmed to perform different functions to handle, for example, differing line protocols, etc. In addition, the line processor hardware can be optimized for differing bit rates, etc. Thus, a single processor may include a first group of identical line processors, each handling one of a first group of communication lines, some of which may perform different functions under software control while a second group of line processors, whose construction may differ from the first group, is arranged to handle communication lines of a second group which may be, for example, carrying information of a bit rate which is different from the bit rate of the communication lines of the first group.

BRIEF DESCRIPTION OF THE DRAWINGS

Further more specific characteristics of the invention will now be explained in connection with the attached drawings in which like reference numbers identify identical apparatus and in which:

FIG. 1E shows the relationship between a portion of the bus and various system components;

FIG. 1F(a) and (b) shows the appearance of a portion of the bus for two embodiments of the invention;

FIG. 1G shows the executive-executive link in an embodiment such as that shown in FIG. 1B;

FIG. 2 illustrates typical data flow on the bus in relation to several control signals;

FIG. 4 illustrates time relationships between several of the control signals;

FIGS. 6B, 6C and 6D illustrate detailed schematics of portions of the arbitrator bus clock and control circuit;

FIG. 10A illustrates bus access circuitry of executive processor and FIGS. 10B and 10C show typical waveforms occurring during operation.

DETAILED DESCRIPTION OF PREFERRED EMBODIMENTS

Figure 1A:
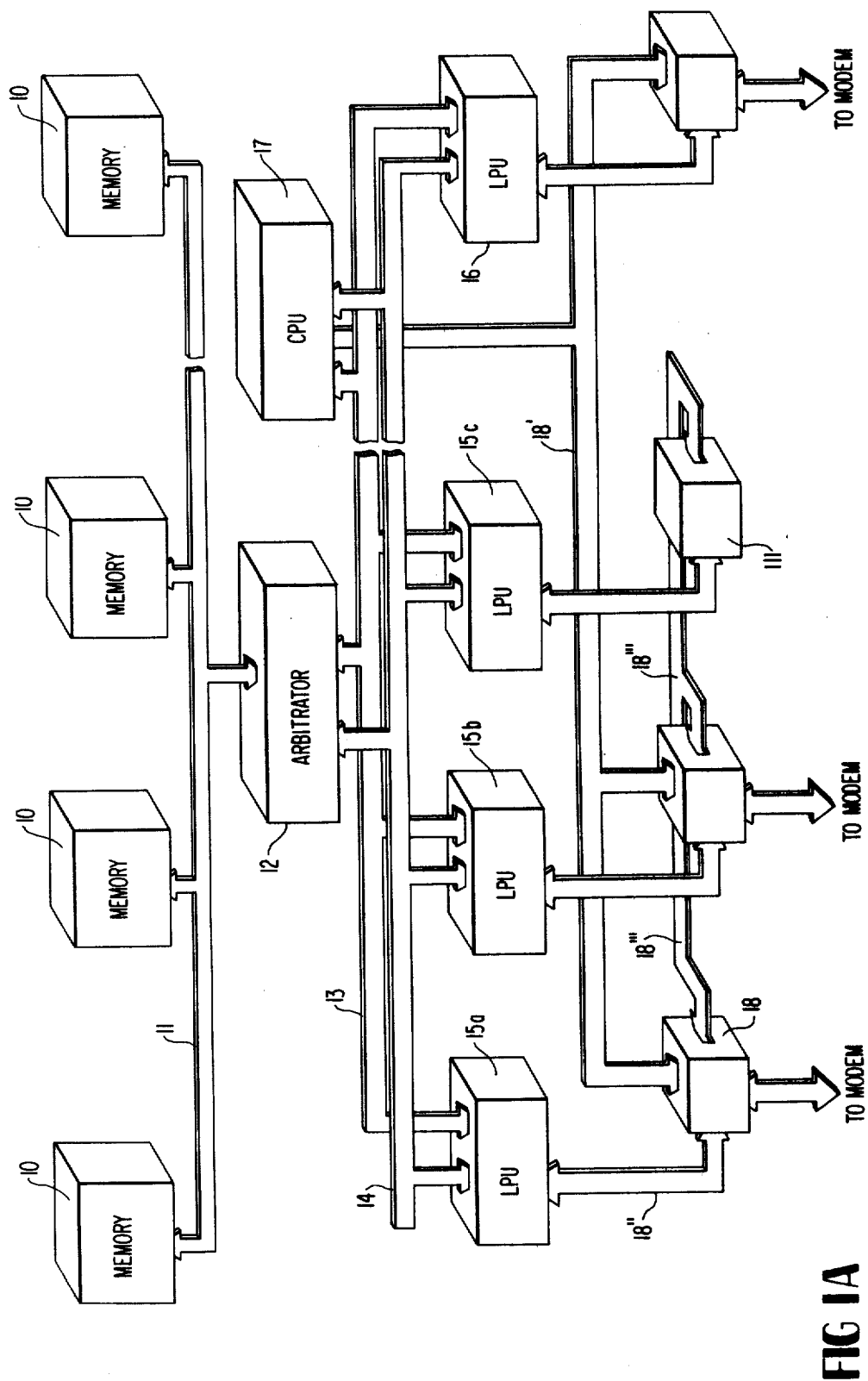
FIGS. 1A and 1B are block diagrams showing two different embodiments of the invention.

Referring to FIG. 1A, the system depicted in block diagram form includes a central memory resource comprising a plurality of memory modules 10 each coupled to a memory bus 11. The memory bus 11 actually comprises 3 information buses. A memory address bus (MAB), a memory data in bus (MDIB), a similar memory data out bus (MDOB) and a R/$\overline{W}$ control. Each memory module includes latches actuated by a strobe generated by the arbitrator 12. Each memory module includes apparatus for parity checking on both the address and data buses. Detection of parity errors return appropriate signals to the arbitrator. A further control bus is provided having a remote memory access completed (REM DONE) signal.

The arbitrator 12 controls all accesses to the common memory from either of the demand assigned buses 13 or 14. Under arbitrator control, up to 50% of the bus bandwidth is available to the CPU 17 while the remaining bus bandwidth is assigned on demand to the line processors (LPU). In addition to the demand assigned bus control, the arbitrator 12 includes read-only memory accessible by any of the attached processors to enable system-wide initialization start up and loading. The arbitrator includes bus granting circuitry with parity monitoring for the address and data portions of the demand assigned buses, interfaces for both buses, an interrupt stack to hold CPU interrupts from any of the line processors, an interface for the memory and memory error registers and failed address registers.

The arbitrator 12 is coupled to redundant demand assigned buses 13 and 14. Each of the buses 13 and 14 are identical and comprise a plurality of address, data and control lines, coupled to tri-state drivers in the arbitrator 12.

The redundant buses 13 and 14 are coupled to a plurality of line processing units 15 and 16. As suggested in FIG. 1, each system may include line processing units of different types depending upon the communication needs. Typically, the inventive communication processor may have plural copies of any line processing unit of a single type to handle different groups of communication input lines. Typically, regardless of type, each line processing unit includes its own local clock, random access memory as well as read-only memory. The major component of each of the line processors is a microprocessor, for example, MOS Technology 6502A. In addition, each line processor includes bus access circuitry cooperating with the bus granting logic of the arbitrator, interfaces for both of the buses, a watchdog timer for failure detection, automatic retry circuitry for parity errors and controls for its various communication inputs.

Also coupled to both of the demand assigned buses 13 and 14 is a central processor 17. The central processor 17 includes a similar microprocessor, its own clock, random access memory and read-only memory, bus access circuitry, a watchdog timer for failure detection, and several interfaces. One interface provides for operator command inputs, a second controls the various interface switches to be discussed hereinafter, another interface allows the central processor to configure the system, i.e., a selection of the demand assigned buses, arbitrator, bus passing and line processor and bus selection. A further interface is coupled to the buses 13 and 14 and finally a last interface provides a direct link between the CPU 17 and another CPU if connected in the system.

The last major component of the communication processor is a plurality of interface switches 18, one associated with each line processor, to couple a modem to the line processor over a bus 18". A plurality of interface switches 18 which are associated with line processors of identical type may be coupled to a common bus 18''', as shown in FIG. 1. CPU 17 can control the interface switches 18 over a control bus 18'. The spare LPU 15c is coupled to the common bus 18''' through a driver 111. This arrangement provides redundancy 1 for N in the following fashion. Assume that LPU (line processing units) 15a and 15b are active and LPU 15c is inactive. A failure in LPU 15a can be remedied by controlling the interface switch 18 associated with LPU 15a to couple the modem formerly associated with LPU 15a now to LPU 15c through driver 111. Thus, LPU 15c provides back-up capacity for a plurality of identical LPU's. Detection and response to such a failure in LPU 15a would include an alarm to alert maintenance to either correct or replace LPU 15a such that normal data flow can be restored and to allow LPU 15c to resume its back-up capability.

A unique Demand Assigned Bus (DAB) is used to handle the contention of common multiple LPU's and CPU's for remote memory accesses. The approach used provides for different access rates for CPU's and LPU's, yet insures that no processor will be locked out from accesses due to heavy traffic.

Figure 1B:
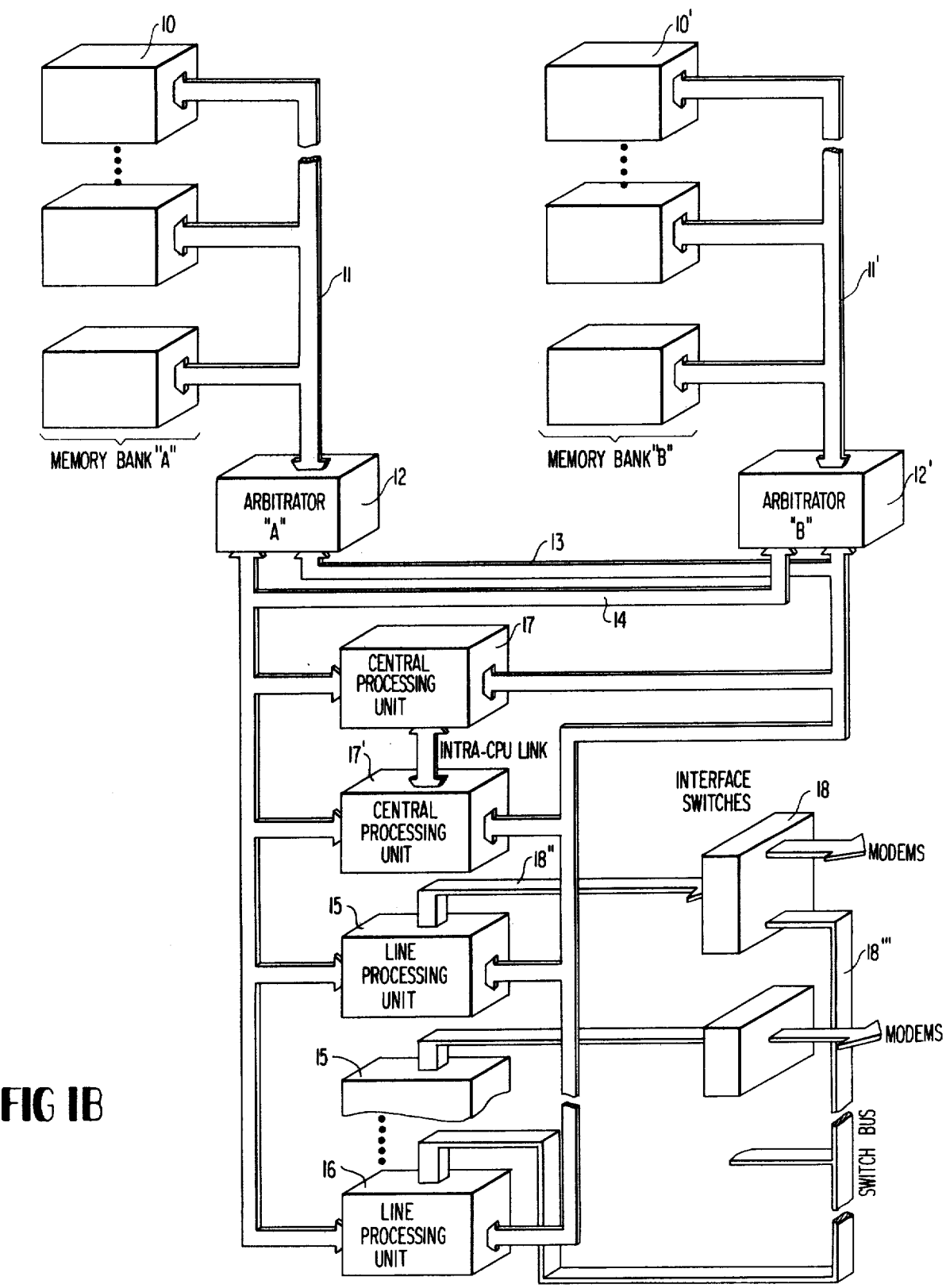
Figure 1C:
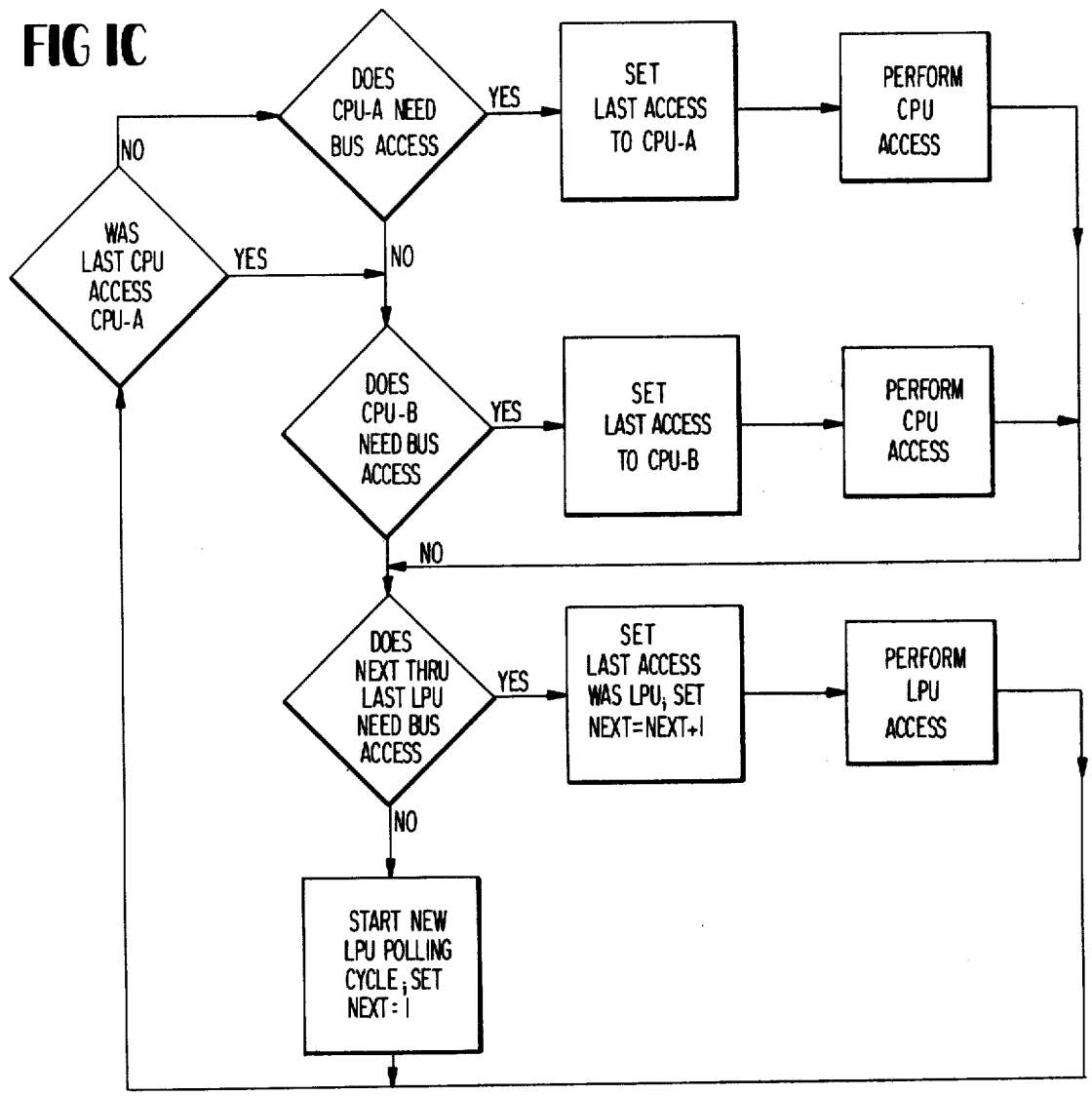
FIG. 1C is a flow diagram of the hardware implemented process for distributing bus access.

FIG. 1C shows a flow chart of the hardware implemented algorithm used for the CPU/LPU arbitration logic. Assuming that multiple LPU's and both CPU's require memory accesses, the arbitration logic will sequence them in the following manner:

CPU-A, LPU-K, CPU-B, LPU-L, CPU-A, LPU-M, CPU-B . . .

Should no CPU's require memory accesses, the LPU's are granted the additional available time slots in the scan of all the processors. When an LPU has had an access or passes his turn in the scan, it is not allowed any more accesses until a new scan is initiated. This prevents a single LPU from tying up the bus and insures equal priority to all LPU's.

The hardware design allows a look-ahead check to determine if any LPU ahead of the present accessing LPU needs accesses. If none do, the scan is reinitiated, saving wasted time. In addition, the polling normally occurs as a parallel function during either an LPU accessing memory or a CPU accessing memory and therefore the polling does not add any significant delay.

The DAB polling structure uses a "rippling" daisy chained signal to enable the line processor unit (LPU). A signal, BUS GRANT, is initiated at the arbitrator and ripples from an LPU to the adjacent LPU through each LPU's bus granting logic (BGL). The receipt of this signal by the BGL presents it an opportunity to use the DAB on the next cycle of the bus clock.

If the LPU needs to use the DAB, the BUS GRANT signal's propagation to the next LPU is momentarily held. On the start of the next DAB clock cycle, the LPU utilizes the DAB and simultaneously releases the BUS GRANT logic to ripple to the next LPU that desires access to the DAB's next clock cycle.

Once an LPU has either used or had an opportunity to use the DAB, it is locked out from using the DAB again until an END OF CYCLE (EOC) pulse is received from the arbitrator. The EOC signals the start of a new scan of the LPU's. It is generated as a function of two events, none of the LPU's need access to the DAB or a failure has caused the time between scan to extend beyond the preset limit.

Since this DAB control architecture is serial, i.e., signals are fed from one LPU to the next, it is susceptible to varying the number of modules in the system by insertion or extraction of modules, etc. inserting or extracting modules obviously changes the adjacent relationship of the various modules, i.e., which one is next. To minimize this problem, modules may be placed up to four card slots apart. The BGL automatically detects the position the card that feeds it the BUS GRANT signal. This is done by a signal called CARD PRESENT which is generated by each LPU. Thus, the BGL logic, based on the CARD PRESENT selects the proper BUS GRANT.

Figure 1D:
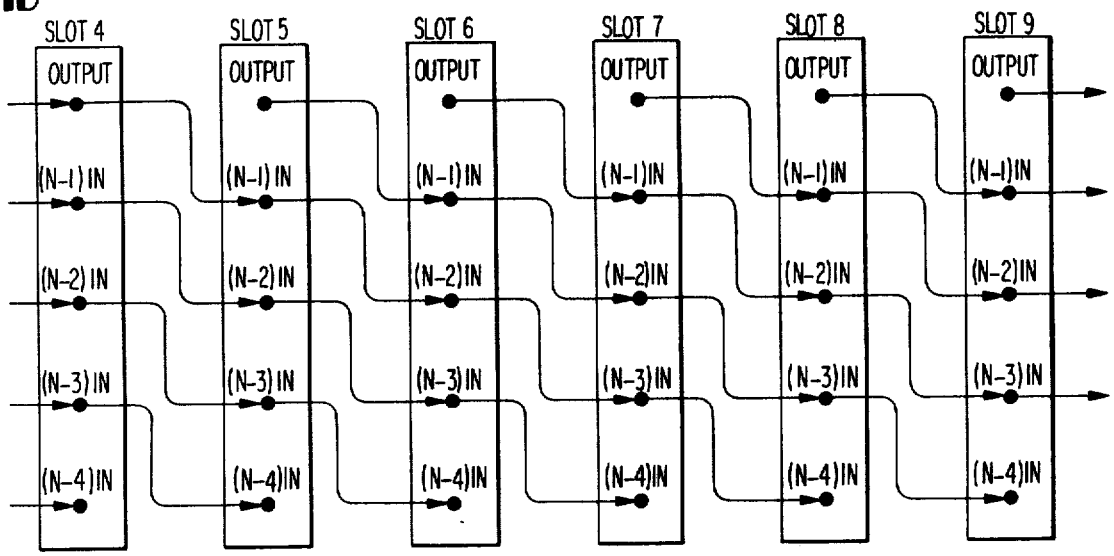
FIG. 1D shows the conductor-card slot arrangement for BUS GRANT and CARD PRESENT.

Each LPU receives four BUS GRANTS and four CARD PRESENTS. FIG. 1D shows a typical flow of signals for one of the above signal types. Note that each output is fed to the next four card slots (positions). Thus, SLOT 8 has visibility of SLOTS 7, 6, 5 and 4. The BGL using priority logic, based on the incoming CARD PRESENTS, selects the appropriate BUS GRANT. In this manner, cards may be added or removed, as long as the chain of LPU's never have gaps of more than 3 card slots. Of course, the "look-ahead" number of 3 can be increased or decreased as desired.

FIG. 1B illustrates an embodiment wherein all the common equipment is duplicated, that is, there are two central memories 10 and 10', two arbitrators 12 and 12', two executive or background processors 17 and 17', and two buses 13 and 14. Depending redundancy and throughput considerations the communication processor can be configured in fully redundant or load sharing modes. Any LPU or CPU can work with either bus which may, in turn, be connected to either memory.

Various types of LPU's can be provided to support 4 or 8 lines using synchronous, asynchronous, BSC, SDLC or X.25 protocols. New LPU's can be inserted, up to some maximum number, while the communication processor is operating.

Since an arbitrator can only be arbitrating on one bus at a time, a signal from the CPU in control to the arbitrators selects the pairing. Since the pairing is mutually exclusive only one signal is required for the function. At start-up neither CPU 17 nor 17' is in control but this is determined by the CPU's themselves, one obtaining control and becoming MASTER. The MASTER locks out the other until control is relinquished voluntarily or a failure occurs. The MASTER can also force LPU's from one bus to another to correct for failures. Normally, bus selection is a local function, except at start-up.

There are basically three (3) types of buses and all are included in the phrase bus unless one type is specified:
DAB Control Bus
DAB Data, Address and Clock Bus
Inter-CPU Signals FIG. 1E shows the interconnection of the DAB Control Bus. There are two of these buses in the system. Since the arbitrator and DAB bus pairing, i.e., DAB-A or DAB-B, is selectable by the Master CPU, the source of the BUS GRANTING signals will vary with the selected arbitrator. FIG. 1E shows arbitrator 12 on bus 14 and arbitrator 12' on bus 13.

FIG. 1F shows the DAB Data, Address and Clock Bus for (a) single or (b) double chassis systems. These buses may be interconnected between two chassis to minimize the overall length. The buses run between J1 to J63 and J2 to J64. J1 and J2 are normally terminated and provide a DC level to all lines indicating parity error (if an LPU or CPU does not turn-on at the proper time, the arbitrator will definitely detect an error). J63 and J64 are also terminated in a single chassis system, thus terminating both ends of the bus. In a two-chassis system, the terminators at J63 and J64 are removed from both chassis and replaced with a cable that ties the buses together.

FIG. 1G shows the interconnection technique for the Inter CPU Signals. These signals are not bus oriented; instead they are point to point signals.

PIPELINED BUS OPERATION

As mentioned above, in order to efficiently employ the bus capacity, a pipelined operation is employed, and the pipelined aspect of the use of the buses is illustrated in FIG. 2 in relation to two signals generated by the arbitrator 12. Those signals are BUS CLOCK and LPU GATE. The scan for distributing bus access consists of a number (variable) of accesses. Each access is defined by a repetition of the BUS CLOCK (the generation of this clock will be described hereinafter). The rising edge of $\overline{\text{BUS CLOCK}}$ initiates an access and the positive portion of $\overline{\text{BUS CLOCK}}$ defines the direction of information flow on the bus in the direction of the arbitrator, and correspondingly, the low level to the $\overline{\text{BUS CLOCK}}$ defines information flow from the arbitrator to the bus user. Thus, during the first portion of an access, e.g., T1-T2, the bus carries information flow to the arbitrator and during the second portion of each access, e.g., T2-T3, the bus carries information from the arbitrator.

To illustrate the pipelined nature of data flow on the bus, each bus access is comprised of a first portion of one cycle of BUS CLOCK and a second portion of a different cycle of the same clock. For example, as shown in FIG. 2, LPU 1 uses the first portion of the first clock cycle T1-T2 for transmitting data to the arbitrator. The corresponding return flow of data to the LPU takes place in the second portion of the second clock cycle, T4-T5. Likewise, LPU number 2 employs the bus in a first portion of a clock cycle from T3-T4, and also employs the bus in a second portion of a bus clock cycle T6-T7. As will be explained hereinafter, in order to allow the CPU access to the bus the arbitrator generates an LPU gate. This has the effect, at any LPU, of causing it to ignore the BUS CLOCK to prevent the LPU from transmitting on the bus and thus making the bus available to the CPU. Thus, the LPU gate prevents LPU 3 from transmitting on the bus in the clock cycle beginning at T5. Instead, the CPU has access to the bus in the clock cycle that consists of the first portion T5-T6 and the second portion occurring at T8-T9. LPU number 3 then transmits T7-T8.

Figure 3:
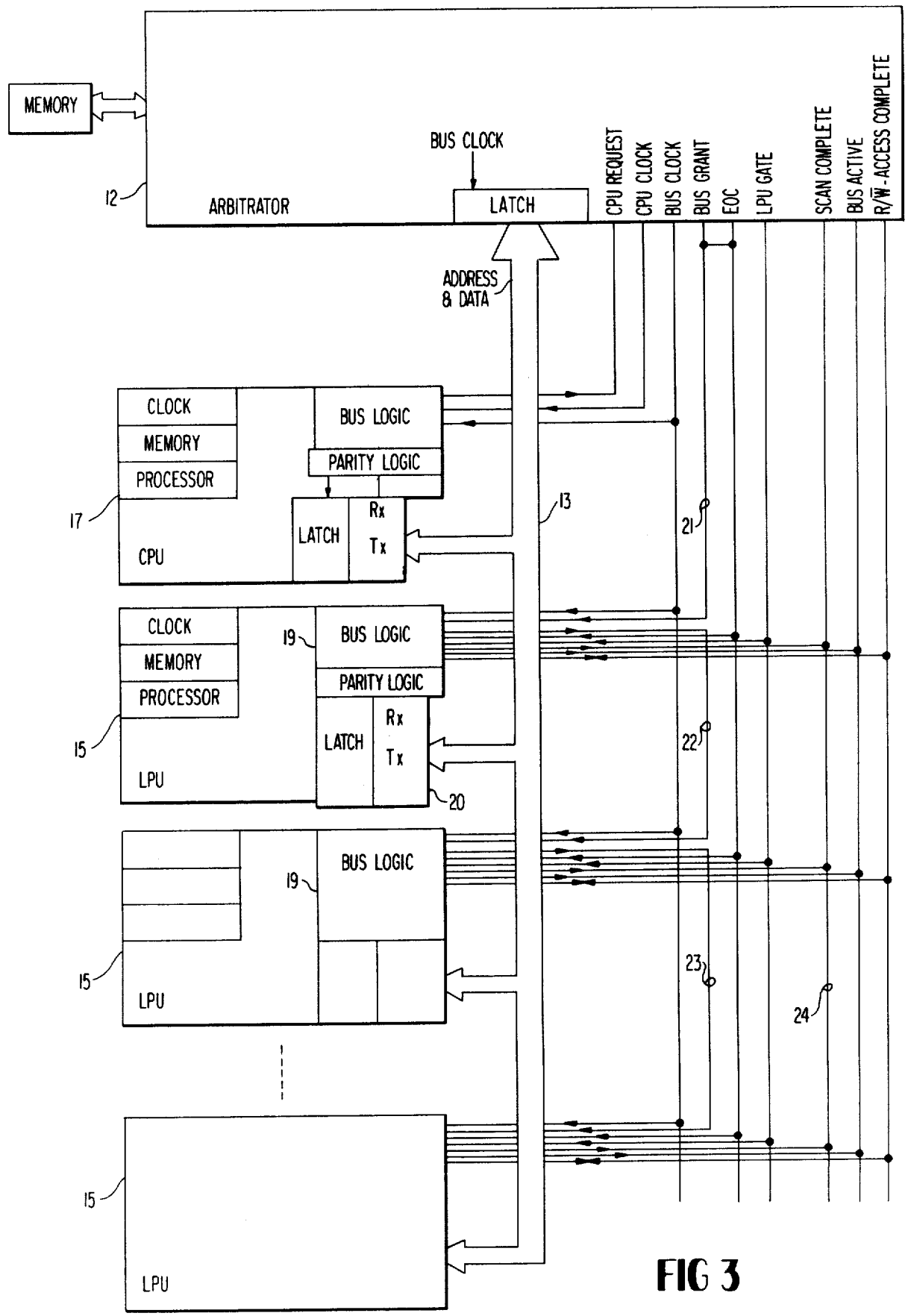
FIG. 3 is a detailed diagram showing control signal distribution.

Reference is now made to FIG. 3 to begin the explanation of the bus granting circuitry and the manner in which the operation shown in FIG. 2 is effected. FIG. 3 illustrates the arbitrator 12 coupled to address and data bus 13 which also couples the CPU 17 and a plurality of LPU's 15. A number of the arbitrator outputs are illustrated, in particular, CPU CLOCK, BUS CLOCK, BUS GRANT, EOC and LPU GATE. Relevant inputs to the arbitrator comprise CPU REQUEST, SCAN COMPLETE, BUS ACTIVE and a common line carrying R/W in one portion of a BUS CLOCK and ACCESS COMPLETE in the other portion.

Dealing first with operation of the LPU 15 and its access to the bus 13, note that each LPU 15 has its own clock, local memory, processor and bus access logic 19. Bus access logic 19 controls the transmitters and receivers in the LPU bus interface 20. Each bus access logic 19 receives as an input a BUS CLOCK, EOC (End of Cycle) and LPU GATE. In distinction to these signals which are coupled in common to each of the bus access logic circuits in each LPU 15, the BUS GRANT signal from the arbitrator 12 is coupled only to one LPU. That signal is conducted over a conductor 21. Each bus access logic circuit 19 has a bus grant input and a bus grant output. The bus grant output of the first LPU 15 is coupled on a conductor 22 only to the bus grant input of a single other LPU. The bus logic 19 of that LPU, in turn, couples a bus grant output on a conductor 23 to the next following LPU, and so on. Each bus granting logic couples a signal SCAN COMPLETE to a conductor 24 which goes high when all LPU's requiring access to the bus have had a chance at an access.

FIG. 4 is a timing diagram illustrating a typical sequence of operation for the apparatus shown in FIG. 3, and more particularly, shows the parallel look-ahead for bus access.

FIG. 4, at the top, illustrates the arbitrator outputs including BUS CLOCK, R/W-ACCESS COMPLETE, EOC and BUS GRANT. As shown in FIG. 3, the BUS GRANT signal is coupled on a conductor 21 and comprises the BUS GRANT into the bus logic circuit 19 of the one LPU.

The arbitrator initiates each scan by generating the just-mentioned BUS GRANT (L) which is forwarded to a single LPU. In the typical sequence shown in FIG. 4, the first line processor has a requirement for access to the bus. On sensing the BUS GRANT signal, as well as its requirement for access to the bus, the logic circuit 19 waits for BUS CLOCK to go positive (M), at that time, the bus drivers are energized (N). As mentioned, the direction of positive portion of BUS CLOCK defines the information flow toward the arbitrator, and at this time, the LPU places its information on the bus. The information flow back to the LPU occurs during the second low period of BUS CLOCK following the period during which the bus drivers are on. Substantially simultaneously with energizing its drivers, the LPU produces a BUS GRANT (O). This signal is coupled over conductor 22 to the next following LPU where it forms a bus grant input (O). In the example shown in FIG. 4, this LPU does not require access to the bus and therefore it immediately forwards a BUS GRANT out (P). This signal is coupled over the conductor 23 and is the BUS GRANT in for the next LPU. This forwarding action continues (Q-R) until the BUS GRANT signal again reaches an LPU having an access requirement. This is the BUS GRANT signal (R). It should be noted that the bus grant out and in sequence N-R occurs simultaneously and in parallel with the bus driver energization of the first line processor. The LPU which senses the bus grant in (R), in the example of FIG. 4, has a requirement for access to the bus and therefore it waits for the next following positive portion of BUS CLOCK. At this time, the bus drivers are energized (S). At the same time as the bus drivers are turned on the BUS GRANT signal is provided to the next processor in turn, and so on, as shown in FIG. 4. When the last line processor requiring access produces the bus grant out, the SCAN COMPLETE signal in the arbitrator goes positive (T). This high going transition generates both the EOC (U) and a new BUS GRANT beginning the next scan (V). The rising edge of the BUS GRANT (V) is sensed by the first line processor which, assuming it does not have a requirement for access to the bus, passes the signal on as other line processors in the previous scan did, until it reaches an LPU which has a requirement for the bus. The bus logic at this LPU waits for the next rising portion of the BUS CLOCK to energize its bus drivers (W). As shown in FIG. 4, this was the only LPU requiring access to the bus in this scan, and thus the scan is again repeated as SCAN COMPLETE goes high.

Figure 5A:
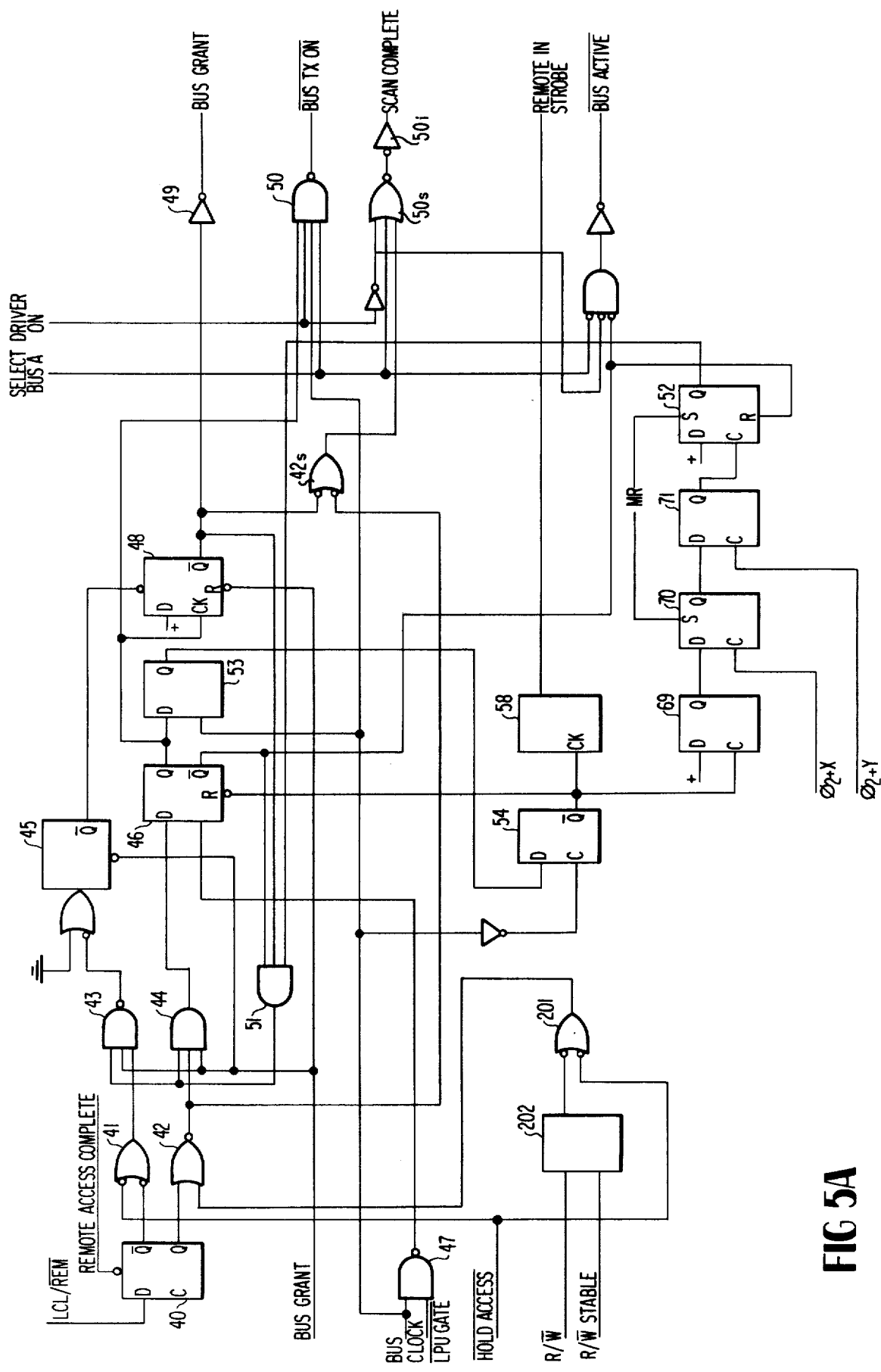
FIGS. 5A and 5B are detailed schematics of bus access circuitry associated with each LPU.
Figure 5B:
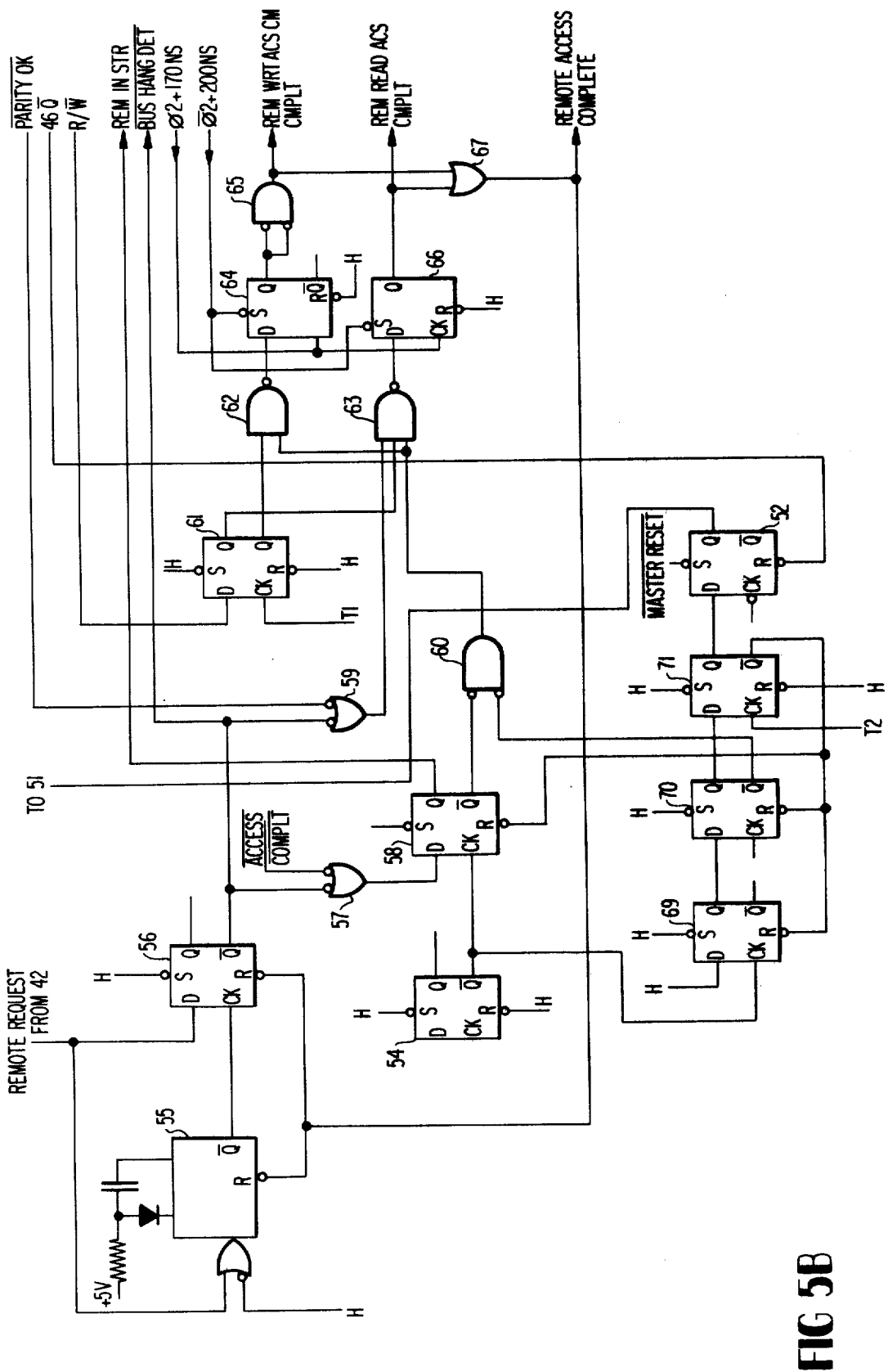

The bus logic circuit 19 which controls the microprocessor access to the bus and its synchronization therewith is shown in FIGS. 5A and 5B. Before referring to FIGS. 5A and 5B, however, reference is made to FIG. 5C to show how the microprocessor, per se, is synchronized to operation of the bus.

Figure 5C:
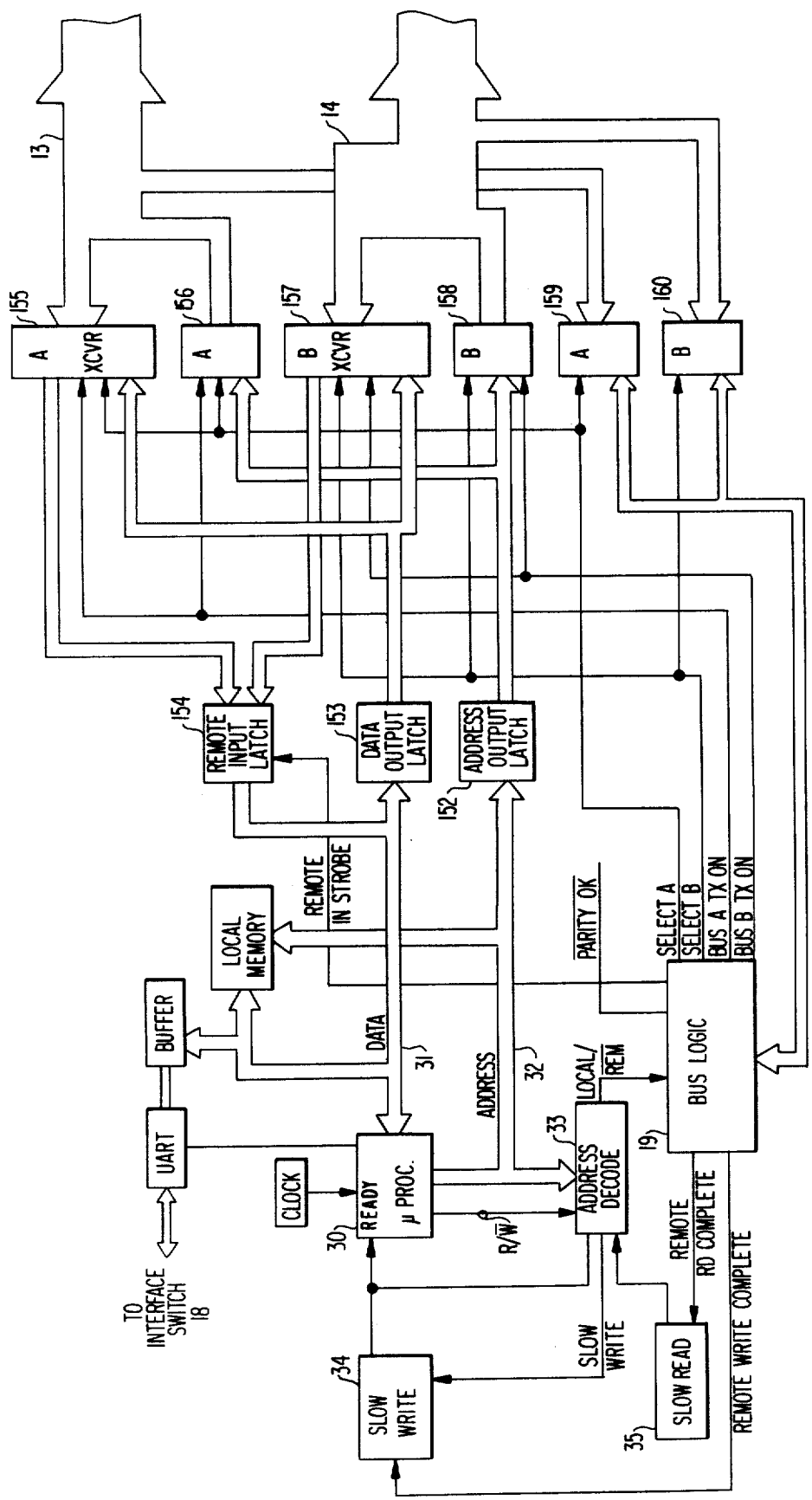
FIG. 5C is a block diagram of an LPU showing relation of various major components.

As shown in FIG. 5C, the LPU 15 includes a microprocessor 30, a data bus 31 coupling the microprocessor to a local memory as well as an address bus 32 coupling the same microprocessor to its local memory. Because remote access over the demand assigned bus is not as fast as the operation of the local memory, the microprocessor must be halted to allow for this longer access time. Microprocessor 30 is halted by using the ready input terminal. The LPU includes an address decoder 33 to detect memory access to remote memory. Line processors local memory provides only a portion of the memory space to which the microprocessor 30 has access. Merely decoding the required address indicates whether or not a remote access is to be conducted. Also provided in the LPU are slow read control logic 35 and slow write control logic 34. If the remote memory access is a write to a slow (i.e., remote) location, a SLOW WRITE signal is sent to the logic 34. This logic causes the ready input of the microprocessor to be held low. Accordingly, the microprocessor will halt at the beginning of the next read microcycle. The ready input will be held low until the control logic 34 receives a REMOTE WRITE COMPLETE at which time the ready input is allowed to go high. Correspondingly, if the address decoder detects a READ ACCESS to a slow location, it sets the READY signal low immediately. This immediately halts the microprocessor. When the control logic 35 receives a REMOTE READ COMPLETE a read ready signal is provided to the decoder which allows the ready input terminal of the microprocessor to go high for continued operation of the microprocessor. When the ready input is low, the E pulse, that is, the simulated microprocessor clock, is inhibited. When the address decoder 33 detects a remote access, the signal LOCAL/REM, to the bus logic 19, goes low indicating the need for bus access. At the same time, the address of the location to be accessed is latched into the address output latch 152, and if the access is a write access, the data is latched into latch 153. The latches 152 and 153 are coupled to the bus transceivers 155-158 so that the latched contents can be placed onto either bus 13 or bus 14 at the appropriate time. The appropriate time is determined by bus logic 19 by producing BUS A TX ON or BUS B TX ON, as appropriate, (A and B referring to 13 and 14).

The foregoing description has ignored the ability of the LPU to view a plurality of slots to determine its nearest active neighbor. At the present time, we can assume that the bus grant input detects the proper signal, the manner in which this is implemented will be explained later.

In the following description, the bus logic is treated as operating with bus grant signals from a single bus. As will be explained later, although bus grant signals are received from both buses (if two arbitrators are operating) the bus grant from the unselected bus is effectively precluded from reaching the bus logic circuit of the LPU.

Referring now to FIG. 5A, the bus logic for controlling the line processor's bus drivers are illustrated. As shown in FIG. 5A, a flip-flop 40 is provided on a D input terminal with the LOCAL/REMOTE signal. The flip-flop is arranged to be set by a signal REMOTE ACCESS COMPLETE. The Q output of the flip-flop is provided to an OR gate 41 which has, on another input, the signal HOLD ACCESS. The Q output of flip-flop 40 is provided as an input to a NOR gate 42. The other input to this gate is provided by the output of OR gate 201 which has the signal HOLD ACCESS on one input and the Q output of flip-flop 202 (negated) as its other input. Flip-flop 202 is set for a read and reset for a write. Insofar as relevant, the output of gate 41 is high when a remote access is not desired and the output of gate 42 is high when a remote access is required. The output of OR gate 41 is provided as an input to a NAND gate 43 and the output of NOR gate 42 is provided as an input to an AND gate 44. The output of NAND gate 43 provides an input to a pulse standardizer comprising an OR gated monostable 45. The output of AND gate 44 is provided as the D input to flip-flop 46. The clocking input to flip-flop 46 is provided by a NAND gate 47. The inputs to NAND gate 47 are LPU GATE and BUS CLOCK. The Q output of flip-flop 46 is provided as the clocking input of a flip-flop 48 and the D input to flip-flop 53. The output of the monostable 45 is the setting input to flip-flop 48. The Q output of flip-flop 48 is provided to an inverter 49 whose output is the BUS GRANT signal which will be coupled to another LPU. The Q output of flip-flop 46 is provided as an enabling input to a NAND gate 50 whose output is BUS TRANSMITTER ON. Feedback AND gate 51 has one input which is the Q output of flip-flop 46, a second input which is the Q output of flip-flop 48 and a third input which is the Q output of a flip-flop 52. The output of AND gate 51 is provided as one input to the NAND gate 43 and the AND gate 44. Another input to each of these gates is the BUS GRANT signal from the arbitrator or another LPU. Flip-flop 53 receives a clocking input of the BUS CLOCK. The Q output of flip-flop 53 is provided as the D input of the flip-flop 54 which receives BUS CLOCK on its clocking input. The Q output of flip-flop 54 is the SAMPLE ACCESS COMPLETE signal which is provided to reset flip-flop 46. Flip-flop 52 has on its clocking input the signal REMOTE CYCLE COMPLETE.

Since each LPU is capable of working either with bus 13 or bus 14, it receives control and timing inputs from each and produces signals to control transmitters for either bus. The circuitry which selects the appropriate BUS GRANT signal will be discussed hereinafter. The LPU also includes bus selection circuitry which is normally controlled by the associated microprocessor, but which can be overridden by CPU 17. FIG. 5A shows control of a generalized bus transmitter and it will be understood that the same circuitry is capable of controlling an identical gate to control transmitters for the other bus. Of course, since the bus selection signals are mutually exclusive, an LPU is active on only one bus at a time.

Figure 5D:
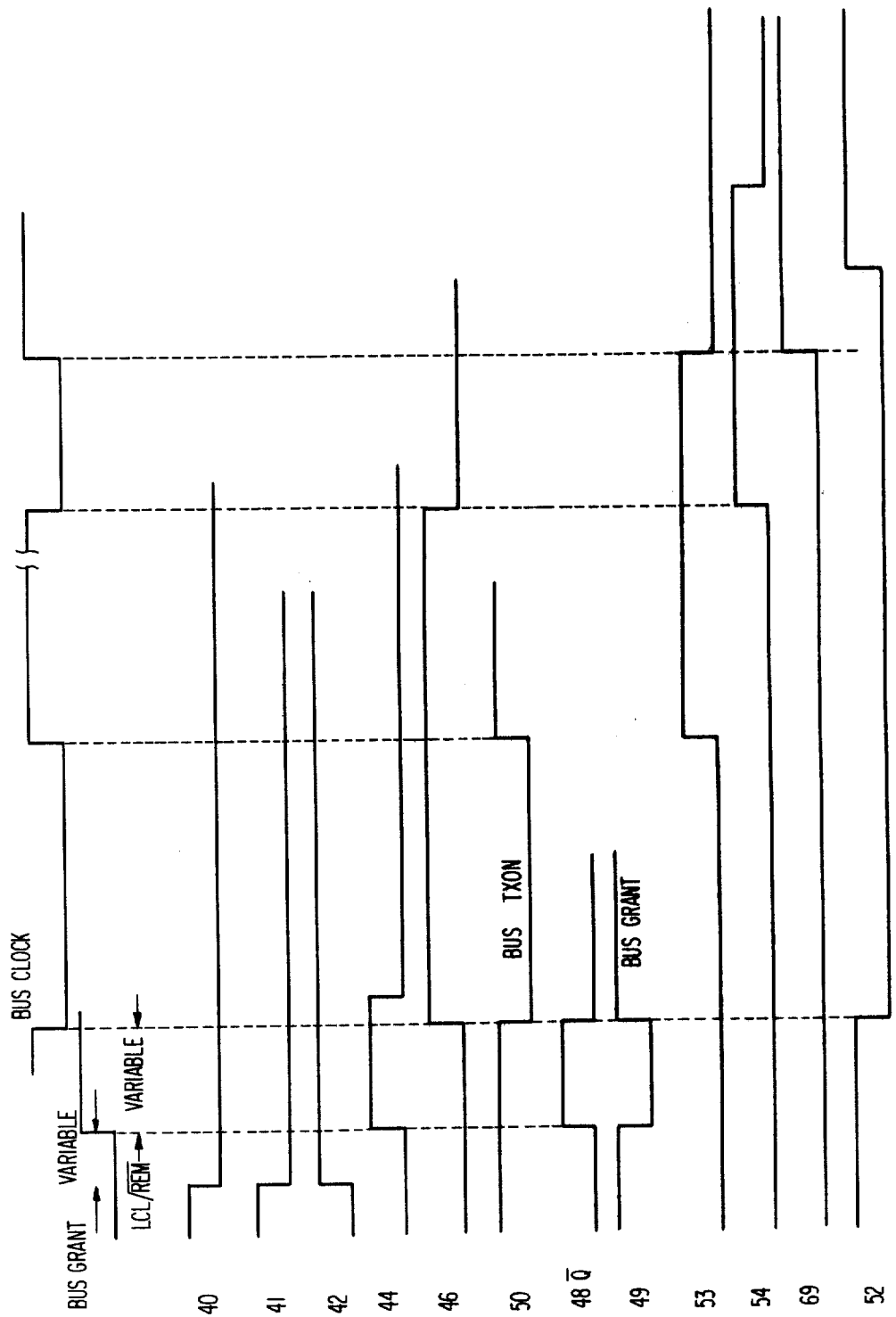
FIG. 5D illustrates typical waveforms relative to FIGS. 5A and 5B.

In a typical operation in which the LPU requires access to the bus, flip-flop 40 is in the reset state by reason of its D input. See FIG. 5D which shows several waveforms produced in the following operation. The low Q output provides one input to the NOR gate 42 whose output is therefore high. The high Q output to OR gate 41, negated at its input provides a low output. AND gate 44 is therefore partially enabled by the high output of NOR gate 42. The output of AND gate 51 is also high at this time (as will be seen hereinafter) and therefore when the BUS GRANT signal is received, the AND gate 44 is completely enabled providing a high input to the D input of flip-flop 46. Flip-flop 46 is also in the reset state at this time and does not change state until the BUS CLOCK provides a clocking input through the NAND gate 47 in the absence of the LPU gate. When clocked, therefore, flip-flop 46 changes state, providing a high Q output which provides an enabling input to the NAND gate 50 driving its output low to energize the appropriate bus transmitter of the LPU inasmuch as the other inputs to the NAND gate 50 are assumed high. The high Q output of flip-flop 46 has two other effects, namely, AND gate 51 is disabled (by the Q output of flip-flop 46) and flip-flop 48 is clocked. The low going transition at the Q output of flip-flop 48 provides an input to the inverter 49 whose output is the BUS GRANT output signal. The bus transmitters remain on for the duration of the BUS CLOCK and are then terminated on the clock transition. At this point, however, the access is only partially completed and a return of information is necessary. Two additional edges of the bus clock must be counted. This function is performed by the flip-flops 53 and 54, which provide the SAMPLE ACCESS COMPLETE signal at the $\overline{Q}$ output of flip-flop 54 to reset flip-flop 46 and for other functions explained hereinafter.

When flip-flop 46 is set, its low $\overline{Q}$ output disables AND gate 51 which in turn disables AND gate 44. When flip-flop 46 is reset AND gate 51 is still disabled by the low Q output of flip-flop 52, which was reset when flip-flop 46 was set, and the low $\overline{Q}$ output of flip-flop 48. Although flip-flop 52 is set at access complete, partially enabling gate 51, flip-flop 48 is not reset until the next BUS GRANT, thus preventing further accesses until the time of the next BUS GRANT.

Simultaneously with energizing the bus transmitters, the signals SCAN COMPLETE and BUS ACTIVE are produced. The SCAN COMPLETE is coupled back to arbitrator 12 from all LPU's in a wired OR fashion such that it goes high at the arbitrator only when all LPU's have had or refused access. BUS ACTIVE is terminated at the time of access completion. The SCAN COMPLETE signal is high at all times at an LPU not requiring access; note the low output of gate 42, producing a high output of gate 42s, a low output of gate 50s and a high output from inverter 50i. If, however, the LPU requires access, the local SCAN COMPLETE goes low, since the output of gate 42 is high, and the flip-flip 48 is normally reset, whereby its Q output is high.

Assuming that the BUS GRANT in was provided at a time when the flip-flop 40 was set, indicating that no remote access was desired, then the output of NOR gate 42 would be low, disabling gate 44, and the output of OR gate 41 would be high. This produces a low output of NAND gate 43 (assuming that gate 51 is enabled as pointed out above). As a result of the low going edge of the output of NAND gate 43, the pulse standardizer 45 will set flip-flop 48. The low going output of the $\overline{Q}$ output of flip-flop 48 produces a high output of inverter 49 which is the BUS GRANT out signal. The remaining flip-flops do not change state inasmuch as flip-flop 46 remains reset.

Thus, regardless of whether or not an LPU requires access to the bus, the BUS GRANT in produces the BUS GRANT out, either immediately in case the line processor does not require access to the bus, or gated with the bus clock, if the line processor requires access to the bus. It should be noted that while flip-flip 46 is reset, and thus the line processor will not have access to the bus again during the same scan, on the next scan, unless the flip-flop 40 becomes set, indicating that the remote access has been completed, the condition of flip-flop 40 will produce another access. Furthermore, referring back to FIG. 5C, it will be noted that the microprocessor 30 remains halted until either a remote read or a remote write access complete signal is received. The circuitry of FIG. 5B generates the REMOTE WRITE ACCESS COMPLETE or REMOTE READ ACCESS COMPLETE, if the access is successfully completed, otherwise, flip-flop 40 remains reset.

FIG. 5B illustrates the remaining components of the bus grant logic. Monostable 55 and flip-flop 56 are coupled to begin timing a predetermined period (in a preferred embodiment, 25 msec.) upon the occurrence of a remote request. The Q output of flip-flop 56 is provided as one input to an OR gate 57 whose other input is the signal $\overline{\text{ACCESS COMPLETE}}$ which may be received from arbitrator 12. The output of OR gate 57 is a D input to the flip-flop 58. The $\overline{Q}$ output of flip-flop 54 (shown in FIG. 5A as well) is the clocking input to flip-flop 58 and the clocking input to a flip-flop 69. The Q output of flip-flop 58 is the signal REMOTE INPUT STROBE. The $\overline{Q}$ output of flip-flop 58 provides one input to an AND gate 60 and the Q output of flip-flop 69 provides the D input to a flip-flop 70 whose $\overline{Q}$ output provides the other input to AND gate 60. The Q output of flip-flop 71 is provided to reset flip-flops 69 and 70 as well as flip-flop 58. The Q output of flip-flop 71 provides the clocking input to flip-flop 52 (also shown in FIG. 5A). The $\overline{Q}$ output of flip-flop 56 is the signal $\overline{\text{BUS HANG DETECTED}}$ which also provides an input to OR gate 59, whose other input is the signal $\overline{\text{PARITY OK}}$. The output of OR gate 59 is one input to a NAND gate 63. Another input to NAND gate 63 is the output of AND gate 60. Finally, the third input to NAND gate 63 is the Q output of a flip-flop 61 whose D input is the signal R/$\overline{\text{W}}$. The $\overline{Q}$ output of flip-flop 61 is an input to a NAND gate 62 whose other input is the output of AND gate 60. The output of NAND gate 62 is the D input to a flip-flop 64 which is clocked by the microprocessor clock. A flip-flop 66 is also clocked by the same microprocessor clock signal, and has a D input provided by NAND gate 63. A further microprocessor clocking signal is provided to set both flip-flop 64 and 66. The Q output of flip-flop 64 is provided to an AND gate 65 connected as an inverter whose output is provided an one input to a NOR gate 67. The Q output of flip-flop 67 is the other input to NOR gate 67.

In operation, when a remote request is received, the monostable 55, flip-flop 56 begin timing out the predetermined period. If, during that time, the access is not successfully completed, the flip-flop becomes set, indicating that a failure has occurred in an information transfer and initiating a restart on a microprocessor. As noted previously, flip-flop 54 provides a SAMPLE ACCESS COMPLETE signal which is used to clock flip-flop 58. Assuming the access has been completed, the Q output of flip-flop 58 is the remote input strobe which allows the data on the bus to be strobed into the remote input latch (FIG. 5C). The ACCESS COMPLETE signal is only provided if the arbitrator has not detected an error.

In the case of a REMOTE READ ACCESS in which the arbitrator returns an ACCESS COMPLETE signal, the flip-flop 58 provides a strobe to latch in the data on the bus. At somewhat later in time, after the parity checking logic of the LPU has checked parity of the input data, the OR gate 59 provides a high input to the NAND gate 63, so does flip-flop 61, along with AND gate 60. The low output of AND gate 63 under these circumstances resets flip-flop 66 when clocked with the microprocessor clock to provide the REMOTE ACCESS COMPLETE signal.

This resets the monostable 55 as well as flip-flop 56 to prevent the $\overline{\text{BUS HANG DETECT}}$ signal. The same signal (at FIG. 5A) sets flip-flop 40 indicating the REMOTE ACCESS has been completed and that the LPU no longer requires access to the bus until a new access signal is generated at the D input of flip-flop 40.

In the case of a remote write access, flip-flop 61 is reset (by its low D input, partially enabling NAND gate 62). At the time of the SAMPLE ACCESS COMPLETE signal, flip-flop 58 provides (assuming the ACCESS COMPLETE signal is properly provided to OR gate 57) an input to enable AND gate 60. Accordingly, the output of NAND gate 62 is low, thus resetting flip-flop 64 at the time of the first microprocessor clock. The low going Q output of flip-flop 64 provides a high output of the AND gate 65. It should be noted that the resetting of either flip-flop 64 or 66 is terminated by the microprocessor clock which sets both flip-flops.

Arbitrator

Figure 6A:
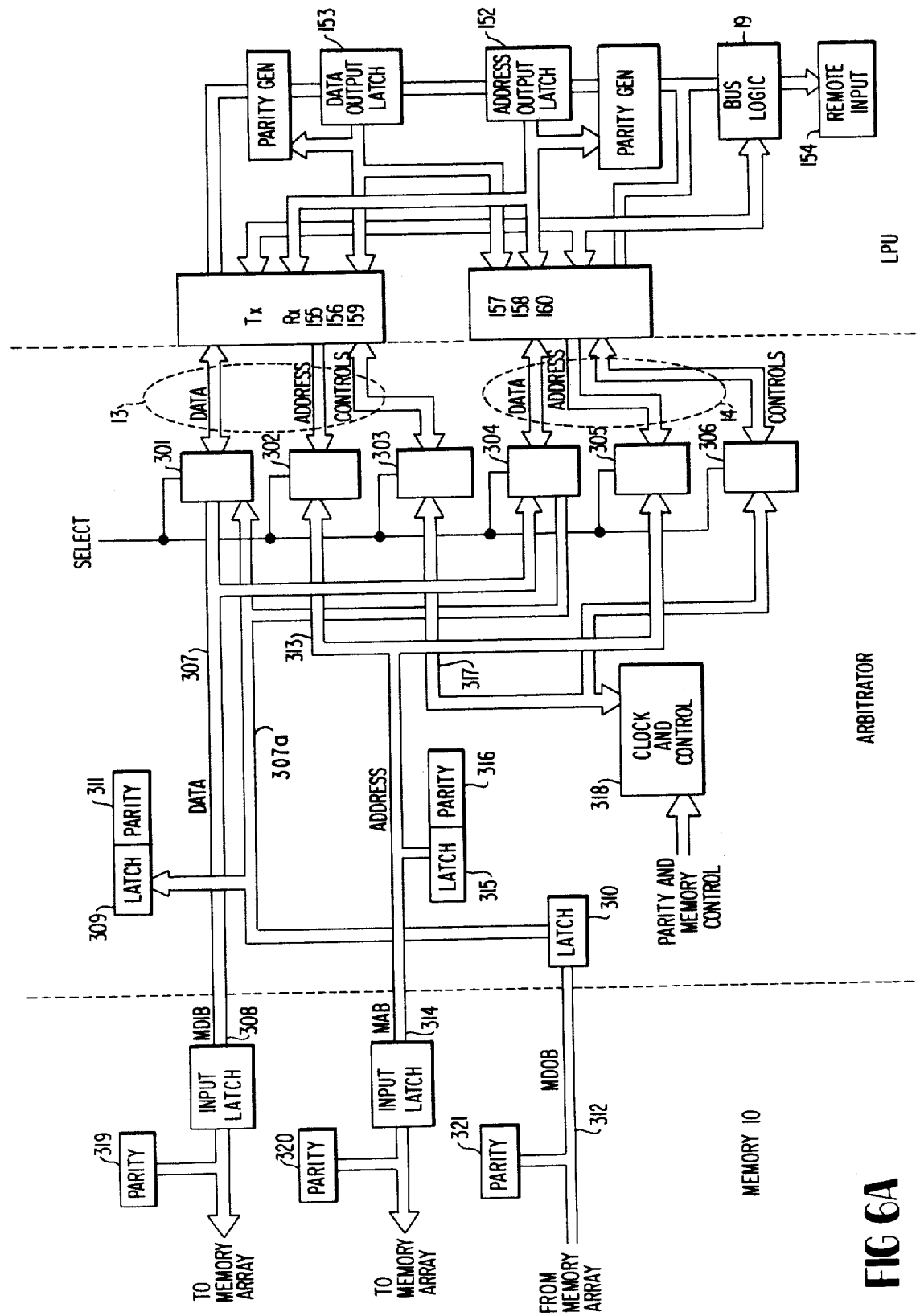
FIG. 6A illustrates the detailed relationship among common memory, arbitrator and typical LPU.

Before describing relevant portions of the arbitrator (FIGS. 6B-6D), reference is made to FIG. 6A to show the relationship between a representative LPU, arbitrator and memory 10.

As shown in FIG. 6A, the data and address output latches 152 and 153, bus logic 19 and remote input latch 154 are coupled to transceivers which couple to the redundant bus 13, 14. The transceivers are controlled by the select and transmitter on signals generated in bus logic 19. Both bus 13 and 14 are coupled to input transceivers 301-306 at the arbitrator. Selection of the appropriate bus is determined by the select signal. Transceivers 301 and 304 are respectively coupled to data portions of the bus 13 and 14 and at the arbitrator side are coupled together over internal buses 307 and 307a. Bus 307 is coupled to the memory array 10 over memory data in the bus (MDIB) 308. Internal to the arbitrator bus 307a is coupled to latches 309 and 310. Latch 309 provides an input to a parity check circuit 311. Latch 310 receives an input from the memory data out bus (MDOB) 312.

Transceivers 302 and 305, coupled respectively to address portions of bus 13 and 14, have their outputs joined in address bus 313 internal to the arbitrator. Address bus 313 is coupled over memory address bus (MAB) 314 to the memory array 10, as well as to a latch 315. Latch 315 provides an input for parity checking circuit 316.

Transceivers 303 and 306 are coupled to the control portion of bus 13 and 14. Their other terminals are coupled to bus 317 and through bus 317 to clock and control circuits 318 of the arbitrator. The clock and control circuits 318 receive, as a further input parity error signals from parity checking circuits 311 and 316 as well as inputs from parity checking circuits 319-321 in the memory 10. Further control signals from the memory marking conclusion of the memory function is also provided to the clock and control circuits 318.

An overview of the operation will briefly be described. Assuming that the LPU partially shown has received the BUS GRANT and has need for a remote access, it enables its transmitters associated with the selected bus. At the arbitrator, the address is coupled to the memory modules 10 over the address bus 313 and MAB 314. It is parity checked by both arbitrator and memory. Data, if a write is being performed, is coupled over bus 307 and MDIB 308 to the memory, parity checking also takes place. During the memory cycle time, just subsequent to the transfers referred to, first the memory provides data (if the previous access was a read) or merely a done signal (if the previous access was a write) to the selected bus through the arbitrator. Next, an address (and perhaps data) is received from the next access. After this receipt the memory concludes the cycle begun with the first transfer. If that had been a read, the data is returned to the selected bus from MDOB 312 and bus 307a. Parity checking is again accomplished.

One component of the clock and control circuits 318 is the circuitry generating BUS CLOCK and BUS GRANT, and is illustrated in FIG. 6B.

FIG. 6B shows clock 75 (at 14.4 MHZ. in a preferred embodiment) driving a counter 77 through a NAND gate 76. The outputs of the counter 77 are provided as an input to a decoder 78, from which fully decoded output pulses are available identifying various portions of the cycle produced at the counter 77. A pair of flip-flops 79 and 80 are employed to actually generate the BUS GRANT signal (and the signal EOC, which, at the arbitrator, are identical). This signal is picked off the $\overline{Q}$ output of flip-flop 80. The D input to the flip-flop is the Q output of flip-flop 79, and both flip-flops are clocked at the output of NAND gate 76. The BUS GRANT signal is a high going transition at the $\overline{Q}$ output of flip-flop 80. This signal is generated as a result of one of two conditions; (1) the signal SCAN COMPLETE is generated as a result of all LPU's, either using or refusing access to the bus in one scan. SCAN COMPLETE is produced and coupled through inverter 86, NOR gate 87, and clocked through AND gate 88, at the appropriate time as determined by the state of decoder 78. And (2) the other apparatus causing the BUS GRANT signal is the bus timeout detector, comprising counters 89 and 90, serially connected and clocked by BUS CLOCK (produced at flip-flop 91, a carry output of the counter 90 setting the flip-flop 92). When the bus timeout signal goes high, it is coupled through NOR gate 87 and has the same effect as SCAN COMPLETE, i.e., new BUS GRANT signal is provided. When the BUS GRANT signal is produced, either as a result of the timeout or as a result of SCAN COMPLETE, the counters 89 and 90 are reset. As mentioned previously, each scan is comprised of a plurality of bus clock signals. The bus clock itself is generated jointly by the clock 75, through the decoder 78 and an OR gate 85, and either the signal $\overline{\text{REMOTE DONE}}$ or LOCAL. The LPU's have access, through the arbitrator, to either arbitrator local memory or one of the memory modules 10, which is considered a remote memory. When a remote memory module completes an access it returns the signal REMOTE DONE, and when the arbitrator local memory performs a memory access, the signal LOCAL is gated with LCL DONE. The REMOTE DONE is an input to the AND gate 81. When either of the conditions are present, the resulting signal is coupled through NOR gate 82 and OR gate 83 to a flip-flop 84 whose output is provided both to reset the counter 77 and through OR gate 85 to the flip-flop 91. The Q output of flip-flop 91 is BUS CLOCK. Accordingly, while the bus clock has a period which is an integral number of clock cycles, the number of clock cycles in a bus clock is variable depending upon the time consumed in the memory access, either remote or local. The amount of time consumed in a memory access, however, is monitored by the counter 77, and if it completes its count, and produces a carry out, a FORCED DONE will be produced via the carry output terminal of the counter 77, inverter 93 and a flip-flop 94 (also clocked by clock 75).

In addition to controlling bus accesses by the various processors attached thereto, the arbitrator also establishes synchronization between the memory module timing and the bus clock. The address (and data if a write) generated by an LPU to the bus is defined as being stable at the arbitrator by the rising edge of the BUS CLOCK. At this time, information on the bus is latched into the arbitrator (address data is latched in if BUS ACTIVE is present, data is depending on BUS ACTIVE and R/W̄), and also forwarded to the memory modules 10 on MDIB and MAB. Shortly after the address and data reaches the modules, a strobe signal is generated which initiates the access on the memory module. When the control logic on the selected module detects completion of the access, it returns a DONE pulse. If it was a read access, then the 8 bits of data plus parity is placed on the MDOB. The DONE pulse signals to the arbitrator to generate another BUS CLOCK, see FIG. 6B. This allows various speeds of memory modules to be intermixed providing a self adjusting access rate on the demand assigned bus. If a memory module fails to return a DONE pulse within a prescribed time (see FIG. 6B), the cycle is completed with a FORCED DONE sequence. At the same time as the addressed memory module 10 puts out the DONE pulse, it may also generate control signals to indicate whether or not there are any parity errors (parity circuits 319-321). These errors include the control signals DIPE (Data In Parity Error), DOPE (Data Out Parity Error) and APE (Address Parity Error). In addition the arbitrator also includes parity checking (311, 316) and itself generates signals ADIPE (Arbitrator Data In Parity Error), AAPE (Arbitrator Address Parity Error).

Figure 6C:
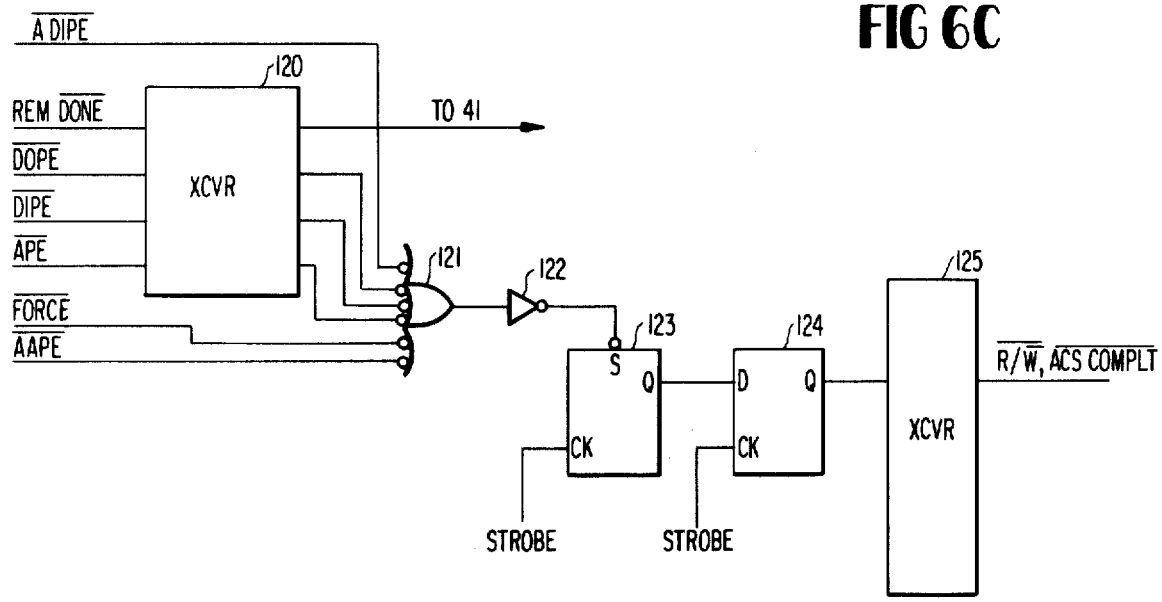

FIG. 6C illustrates the portion of the arbitrator control circuits used to produce ACCESS COMPLETE.

Input to the arbitrator's transceiver 120 are the signals DONE, DOPE, DIPE, APE. The transceiver 120 couples the signals DOPE, DIPE and APE to a multi-input OR gate 121. In addition, the signals $\overline{ADIPE}$ and $\overline{AAPE}$ are also coupled to the same OR gate 121. The circuits to produce these signals are illustrated in FIG. 6A. Furthermore, the signal FORCED DONE is also provided to the OR gate 121, the last-mentioned signal being produced as shown in FIG. 6B. Assuming that all these signals are high, i.e., no parity errors have been detected and the REMOTE DONE signal has been received within the allotted time, i.e., before a $\overline{FORCED \ DONE}$ is produced, the output of OR gate 121 will be low, producing a high output of an inverter 122, which is employed to set a flip-flop 123. The Q output of flip-flop 123 is provided to set a flip-flop 124 in connection with the strobe signal from the bus clock. The Q output of flip-flop 124 provided as one input to a multi-input arbitrator transceiver 125. The corresponding output of the transceiver 125 is the conductor in the demand assigned bus which carries the signal R/W̄, and ACCESS COMPLETE. During the portion of the bus clock in which information is flowing from the LPU to the arbitrator, the signal on this conductor determines whether or not a read or write access is being performed. In the other portion of the bus clock, the line carries information from the arbitrator to the processor regarding whether or not the access has been completed. The ACCESS COMPLETE signal carried by this conductor is employed by the OR gate 57 (see FIG. 5B). Thus, in the absence of the specified parity errors, and in conjunction with the DONE signal from the memory, the signal ACCESS COMPLETE is produced and forwarded to the processors.

Bus Grant Selection

One of the goals of the invention is to provide a modularized processor in which the processing power can be augmented or decremented without requiring the processor to go off line. The modularized approach is facilitated by implementing each of the line processors, the arbitrators, CPU's and interface switching modules as separate cards. The processing power can be augmented, for example, by increasing the number of line preprocessing units, or decreasing the number of line processing units. As is conventional in the art, the various cards are arranged in a chassis and each card slot has a plurality of connectors to allow electrical connections to be made to the card when it is fully inserted in a slot. Since line processors operate substantially independently of other line processors, the removal or addition of a line processor has little effect on the other line processors except for the bus granting logic. Since this logic is based upon a daisy chain bus grant offering, some arrangement must be made for adding a card comprising a line processor into the daisy chain. The requirement is fulfilled in the following fashion.

The bus includes a plurality of conductors to carry a BUS GRANT signal from card to card. As shown in FIG. 1D, each slot has connectors N1-N4 to receive the BUS GRANT signal. The N1 input of any card comes from the bus grant output of the preceding slot, the N2 input for any card comes from the bus grant output of the slot preceding its neighbor, and so on. The bus grant inputs N1-N4 on any card are provided to a multiplexer, and the multiplexer output is provided as the input to the bus logic circuitry 19 on each line processor. In accordance with the invention there are no requirements for a card to occupy each slot in the chassis, and indeed, there can be as many as three empty slots between cards since each slot has a four slot view. (Of course, the number of empty slots provided for can be changed by merely increasing the field of view from any slot.)

In order to maintain the daisy chain arrangement, of course, any card, such as the card in slot 8, must "know" the position of its nearest neighbor upstream. To provide this "knowledge" a further plurality of conductors are provided, available at each slot in the same fashion as the bus granting conductors are wired and these carry CARD PRESENT. Thus, any input N1 is provided with the CARD PRESENT signal from a card in the preceding slot, the input N2 is provided by the next preceding slot, and so on. These inputs N1-N4 are provided to a priority encoder. The priority encoder determines the lowest number input carrying a CARD PRESENT signal, and controls the multiplexer to couple the BUS GRANT signal from the corresponding conductor to the bus granting logic 19. Thus, each card includes a card present signal generator which is manually controlled by a front panel switch. In this fashion, the line processor located in any slot knows the location of its nearest upstream neighbor and is adjusted to accept the bus grant input from that neighbor. It should be apparent from the preceding that since card presence is determined by the presence of the CARD PRESENT signal, unused cards can be stored in the slot without causing confusion by removing the CARD PRESENT signal. With this signal absent, the card is "invisible" to the system.

Bus Selection

The processor, in the configuration shown in FIG. 1A, including only a single arbitrator 12, has only a single active bus at any one time. Nevertheless, the configuration of FIG. 1B, including two arbitrators 12 and 12', can have two simultaneously active buses. Each of the arbitrators 12 and 12' controls one of the buses. A functional diagram of how the buses are wired is shown in FIG. 1E. As illustrated there, the arbitrator 12' controls bus 13, and the arbitrator 12 controls bus 14. Since each of the buses are continuous, each of the LPU's receives signals from each of the buses, even though an LPU can only be operating with one bus at a time. The arbitrator, to some extent, is identical to an LPU in that, in respect of the bus to which it does not control, it merely passes on the BUS GRANT IN signals. In order to effect the selection process, the control logic for each LPU, and an arbitrator, includes apparatus schematically shown in FIG. 9.

Figure 9:
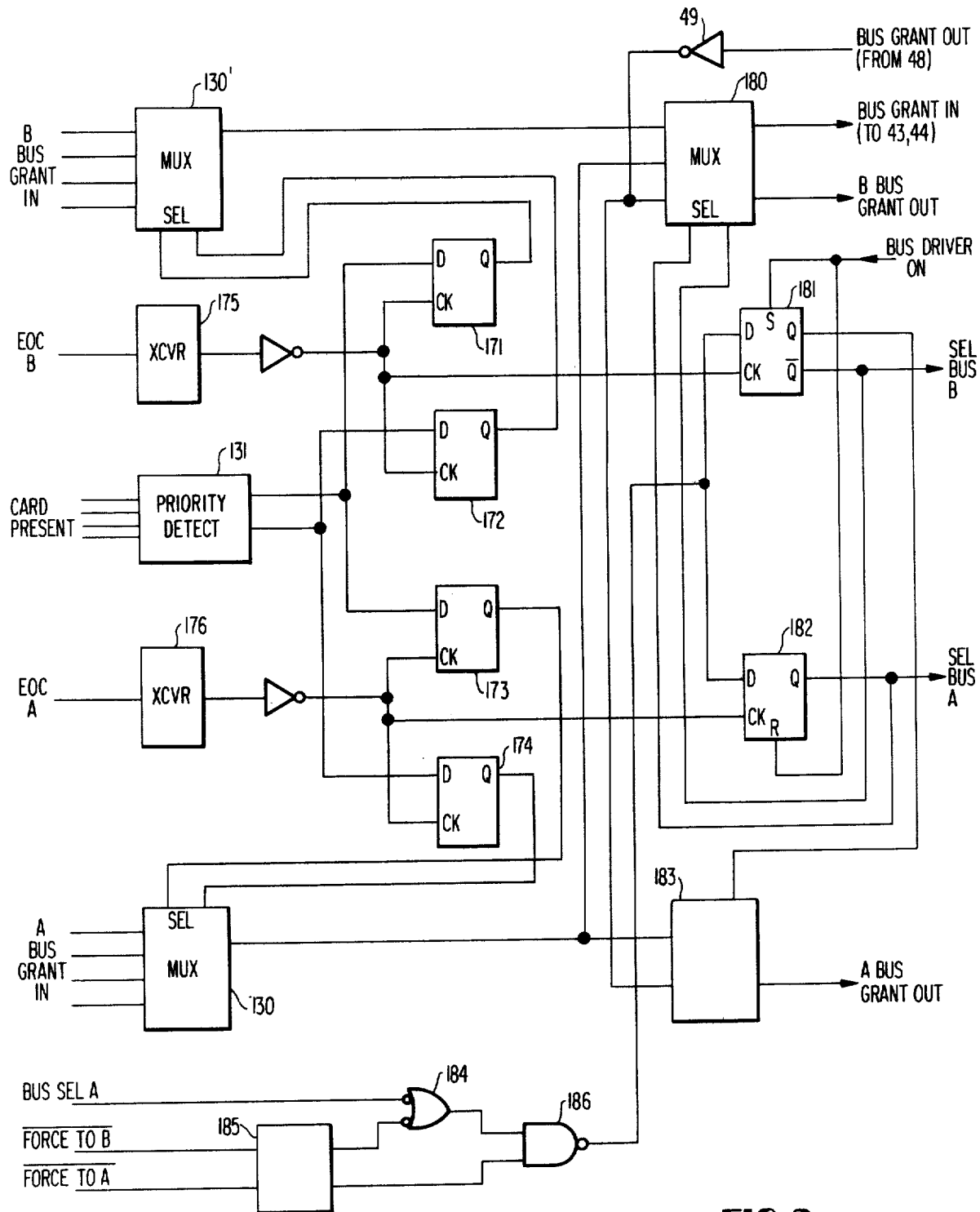
FIG. 9 illustrates generation of bus selection controls at an LPU as well as circuit schematic showing coupling between BUS GRANT and CARD PRESENT inputs and bus access circuits.

As shown in FIG. 9, the plural bus grant in lines for the 13 and 14 buses are coupled respectively to multiplexers 130 and 130'. These are the multiplexers mentioned with respect to FIG. 1D. The priority encoder 131 (also mentioned with respect to FIG. 1D) is coupled to the four previous cards and operates the select a CARD PRESENT signal of the closest card. The output of the priority encoder 131, a two bit binary signal, is coupled to two pair of flip-flop 171 and 172 and 173 and 174. The EOC for each bus is coupled through, respectively, transceivers 175 and 176, through inverters to clock the flip-flops. More particularly, the END OF CYCL (bus 13) signal is coupled to clock flip-flops 171 and 172 whereas the END OF CYCLE (bus 14) signal is coupled to clock flip-flops 173 and 174. The Q outputs of flip-flops 171 and 172 are provided as the selecting inputs to the multiplexer 130' and the Q outputs of flip-flops 173 and 174 are coupled to the selection inputs of the multiplexer 130. Since the pairs of flip-flops 171, 172, and 173, 174 receive identical inputs, their outputs, and therefore the selection made by the multiplexers 130 and 130', is usually identical. Since, however, the flip-flops are clocked by different signals, they change their conditions in response to changing CARD PRESENT signals at different instants of time. The selected outputs of both multiplexers 130 and 130' provide an input to a multiplexer 180. The selection inputs to this multiplexer are derived from the outputs of flip-flops 181 and 182, and the selected input of multiplexer 180 is provided as the BUS GRANT IN signal to the circuitry shown in FIG. 5A. The BUS GRANT OUT signal from the circuitry of FIG. 5A is coupled through the inverter 49 and coupled as another input to the multiplexer 180 and also as an input to a multiplexer 183. Multiplexer 183 receives also, as another input, the output of multiplexer 130. When present, and selected, multiplexer 180 provides the BUS GRANT OUT signal (for bus 13) which is passed via the bus to the next adjacent four cards. Likewise, when selected and present, the output of multiplexer 183 provides another BUS GRANT OUT signal (for bus 14) over the bus to the four adjacent cards. The control of flip-flops 181 and 182, which determine bus selection, is controlled in the following manner.

Normally, the microprocessor on the card performs bus selection by providing a signal entitled BUS SELECT A, either high or low, to select one or the other of the buses, through one inverting input of an OR gate 184. However, the active (or master) CPU can force all LPU's or a selected LPU to use a selected bus through either of the signals FORCE TO B or FORCE TO A, provided as an input from the CPU to a transceiver 185 on the card. The transceiver 185 provides these inputs, in identical form, one to the inverting input of the OR gate 184 or the other to an input of a NAND gate 186. The other input to NAND gate 186 is provided by the output of the OR gate 184. The output of NAND gate 186 is provided as the D input to flip-flops 181 and 182. The clocking signal for flip-flop 181 is provided by the output of transceiver 175 (EOC B) and the clocking input to flip-flop 182 is provided by the output of transceiver 186 (EOC A). The $\overline{Q}$ output of flip-flop 181 is the signal SELECT BUS B, and the Q output of flip-flop 182 is the signal SELECT BUS A. These signals provide the selecting inputs for multiplexer 180. In addition, the Q output of flip-flop 182, the signal SELECT BUS A is provided as the selecting input to the multiplexer 183. The signal BUS DRIVER ON is provided to set flip-flop 181 and rest flip-flop 182. This apparatus not only provides for the appropriate BUS GRANT IN signal and the selection for the active bus, but also allows for orderly transitions of an LPU from one bus to another without disrupting operations on either bus. This is acheived by not recognizing any change in bus use until END OF CYCLE of the appropriate bus.

Assume for example, that an LPU desires to transfer from one bus to another. Upon making that determination, the microprocessor causes the BUS SELECT A to change. As a result, the inputs to flip-flops 181 and 182 will change. Since these flip-flops are clocked by EOC A or EOC B, no other change occurs at this time. If we assume that EOC A is first produced then flip-flop 182 changes state, followed by flip-flop 181 when EOC B is received. During the period when the EOC's are expected, after selecting a new bus, the processor is inhibited from transmitting on either bus. When both EOC's are received, the multiplexers 180 and 183 change their condition. Thus, for example, if the LPU was on BUS A, then the A grant signals were coupled to the bus logic 19 by the multiplexer 180 and the bus grant out from logic 19 was coupled to the BUS A control portion by the multiplexer 183. The B grant signals never reached bus logic 19, they had merely been passed through multiplexer 130' and 180. After the change the A grants merely pass through multiplexers 130 and 183 while the B grants are coupled through logic 19. The changed condition of flip-flops 181 and 182 also change the selection of the transmitters and receivers which are enabled.

A change in the CARD PRESENT signal from a specific card is detected immediately by all those cards which can view the specific card. More particularly, the priority encoder 131 on the adjacent downstream card changes its output, thus changing inputs to flip-flops 171-174. These flip-flops do not change state until either EOC A or EOC B is received. When it is the condition of the appropriate one of multiplexers 130 or 130' is altered to accept the bus grant out from the proper card.

The CPU

CPU 17 is, in many respects, similar to an LPU so that the diagram of FIG. 5C is an accurate representation of the CPU 17. However, the CPU does not contend with other LPU's for the bus resource except to the extent that the arbitrator makes available to the CPU at most 50% of the bus clocks, and therefore 50% of the bus accesses. In order to effect this, the CPU bus logic is different from that associated with an LPU. When a CPU desires access to the bus, it produces a signal CPU REQ, which has a direct connection to the arbitrator. When the arbitrator determines that the CPU is entitled to use the bus, it returns a CPU CLOCK directly to the CPU. The CPU bus logic is shown schematically in FIG. 10A, and relevant waveforms are shown in FIG. 10B.

FIG. 10A illustrates the bus logic associated with the CPU. The inputs to the bus logic include a select signal for selecting bus A or bus B, CPU clocks on buses A and B, bus clocks on buses A and B, a R/$\overline{W}$ signal, the signal ACCESS COMPLETE, the signal PARITY OK and the signal LCL/$\overline{REM}$. The CPU CLOCK and BUS CLOCK signals as well as the $\overline{ACCESS\ COMPLETE}$ signals are derived from the selected bus and the remaining signals are generated either in the microprocessor itself or in logic associated therewith. Thus, for example, when a remote access is necessary, an address decoder such as the one shown in FIG. 5C, generates the LOCAL/$\overline{REM}$ signal. The type of access, whether read or write, determines the state of the signal R/$\overline{W}$.

As shown in FIG. 10A, the LCL/$\overline{REM}$ signal provides a D input to the local remote flip-flop 400. The signal is clocked in at the correct phase of a microprocessor generated clock 401 which is provided as a D input to a flip-flop 402, whose Q output provides the clocking input to flip-flop 400. A flip-flop 403 has a D input coupled to the Q output of flip-flop 400, and a clocking input provided by the CPU CLOCK. A flip-flop 404 has a D input provided by the $\overline{Q}$ output of flip-flop 403. The Q output of flip-flop 404 is the D input to flip-flop 405 which has a clocking input provided by the BUS CLOCK. A flip-flop 406 has a D input which is the Q output of flip-flop 405. A flip-flop 407 has a D input which is the Q output of flip-flop 406, this flip-flop is clocked by BUS CLOCK. A flip-flop 408 is set by the Q output of the flip-flop 403 and reset by the CPU CLOCK. The Q output of flip-flop 408 provides one input to a NAND gate 409 whose output is the signal $\overline{A}$ $\overline{BUS\ ACTIVE}$, the same input is provided as one input to a NAND gate 410 whose output is the signal $\overline{B\ BUS}$ $\overline{ACTIVE}$. NAND gates 411 and 412 receive as one input the Q output of flip-flop 403, and provide the output BUS TRANSMITTER ON, either A or B. A second input to each of these NAND gates is the CPU CLOCK. NAND gates 409 and 411 receive an input SELECT BUS A and NAND gates 410 and 412 receive the input SELECT BUS B. The Q output of flip-flop 405 is the signal REMOTE IN STROBE. A pair of transmitters 413 and 414 receive as one input the Q output of flip-flop 400. Another input to these is either SELECT BUS A or SELECT BUS B, and their output is a CPU REQUEST, for either bus A or bus B. An OR gate triggered monostable 415 is driven by the Q output of flip-flop 402 and is arranged to time out a period to detect bus hangups, for example, a 25 msec. period. The Q output of the monostable is provided as an inverting input to OR GATES 416 AND 417. The other input to OR gate 417 is the signal $\overline{PARITY\ OK}$, negated. The output of OR gate 417 is provided as one input to a NAND gate 418 the other input to OR gate 416 is the signal $\overline{ACCESS\ COMPLETE}$, negated. The output of OR gate 416 is provided as an input to a flip-flop 419. Flip-flop 419 is clocked by the Q output of flip-flop 405 and provides a D input to a flip-flop 420 whose Q output provides an input to an AND gate 421 and a second input to NAND gate 418. The Q output of flip-flop 420 is provided as an input to a NOR gate 422 whose output serves to reset flip-flop 419. The R/$\overline{W}$ signal provides a D input to flip-flop 423 which is clocked by Q output of flip-flop 402. The Q output of flip-flop 423 provides a third input to NAND gate 418 and the $\overline{Q}$ output of flip-flop 423 provides a second input to AND gate 421.

The output of AND gate 421 is the D input to flip-flop 424 and the Q output of flip-flop 424 is the signal $\overline{REMOTE\ WRITE\ ACCESS\ COMPLETE}$. The output of NAND gate 418 is the D input to a flip-flop 425 whose Q output is the signal $\overline{REMOTE\ READ\ ACCESS\ COMPLETE}$. NAND gate 418 provides an input to a NOR gate 426, the other input to which is provided by the output of AND gate 421 through inverter 427. The output of NOR gate 426 is provided to reset flip-flops 406 and 407. The BUS CLOCK outputs of the receivers 428 and 429 are tied together and provide the input to NAND gate 430 and the clocking input to flip-flops 405, 406, and 407. The output of NAND gate 430 is provided as one input to a NAND gate 431 and the clocking input to flip-flop 404. The output of NAND gate 431 is provided to reset flip-flop 400.

Briefly, when the CPU requires remote access, the CPU request goes low (A—see FIG. 10B). After synchronizing the request, with the bus clock, the arbitrator responds with the CPU CLOCK, which goes low synchronous with the bus clock (B). Receipt of the CPU CLOCK at the CPU enables the CPU to turn its drivers on when the BUS CLOCK goes high (C) at the same time as BUS ACTIVE signal goes low (D). At the arbitrator, when it sees BUS ACTIVE, it performs the operation requested by the R/$\overline{W}$ signal. (That is, read if the signal is high, write if it is low.) In the low going portion of the BUS CLOCK following the access, if successful, the arbitrator provides the signal ACCESS COMPLETE (E). If the access was not successfully completed, the CPU will retry, by generating another CPU request (A). If the bus hang detector (415) expires without a successful access completion, the CPU goes into a restart. To see how these functions are accomplished, the logic of FIG. 10A is now discussed.

Flip-flop 400 is reset when a remote access is desired. At the same time, the signal REMOTE DATA OUT strobes the address and data into the output latches. At the same time, flip-flop 423 has the R/$\overline{W}$ signal loaded. The remote access inhibits the clock 401 and thus the output of flip-flop 402 is stabilized preventing monostable 415 from being triggered and thus it begins timing out its preset period. At the same time, either transmitter 413 or 414 issues a CPU REQUEST, depending on whether bus A or bus B is selected. At the appropriate time, the arbitrator will respond with CPU CLOCK, and depending on whether or not bus A or bus B is selected, either the receiver 428 or 429 will respond and produce the CPU CLOCK signal which clocks flip-flop 403. The low going output of flip-flop 403, coupled through the NOR gate 432 serves to set flip-flop 400. The $\overline{Q}$ output of flip-flop 403 (which is a high going transition) serves to partially enable NAND gates 411 and 412. The BUS CLOCK coupled through the selected one of the receivers 428 or 429 also partially enables both these NAND gates. Depending on which bus is selected then either NAND gate 411 or 412 is fully enabled to turn on the transmitters. The low going Q output of flip-flop 403 sets flip-flop 408 and the Q output partially enables both the NAND gates 409 and 410 to produce the BUS ACTIVE signal. Depending on which bus is active, either A bus or B bus, receives the signal. The negative going edge of the BUS CLOCK clocks the state of flip-flop 403 into flip-flop 404 and the $\overline{Q}$ output sets flip-flop 403 to terminate the bus transmitter enablement.

Thus, as shown in FIG. 10C, flip-flop 404 is reset.

The following operation is the access completion sequence. The next edge of bus clock resets flip-flop 405, since it receives a low D input from the Q output of flip-flop 404. If the access complete is received from the arbitrator it provides a high D input to flip-flop 419 through the OR gate 416. That is clocked into the flip-flop when flip-flop 405 becomes set which occurs as follows. The bus clock edge following the resetting of flip-flop 405 results in the setting of flip-flop 404. With flip-flop 404 set, the next subsequent bus clock transition serves to set flip-flop 405.

Depending on whether the access was a read or write, the flip-flop 423 will partially enable gate 418 or 421. The returned data (if a read) was strobed in when flip-flop 405 was reset. If no parity errors were detected OR gate 417 further partially enables gate 418, assuming the monostable 415 had not timed out. Flip-flop 420 is set if flip-flop 419 was set. The time taken to set flip-flop 420 is used to allow the parity circuits to detect errors. If so, gate 418 or 421 is completely enabled. The output of the appropriate gate has a number of effects. Flip-flop 424 or 425 is set producing either remote write or read access complete. Production of this signal enables the CPU to continue its operation (FIG. 5C).

The production of REM IN STROBE also causes retry flip-flop 406 to change state. The state is shifted to flip-flop 407 with the bus clock. The bus clock after setting flip-flop 407 will result in flip-flop 400 being reset to begin the access sequence again, i.e., retry, unless flip-flop 407 is reset through inverter 427 and OR gate 426. This is possible when the output of gates 418 and 421 indicate that the access was successfully completed.

Figure 6D:
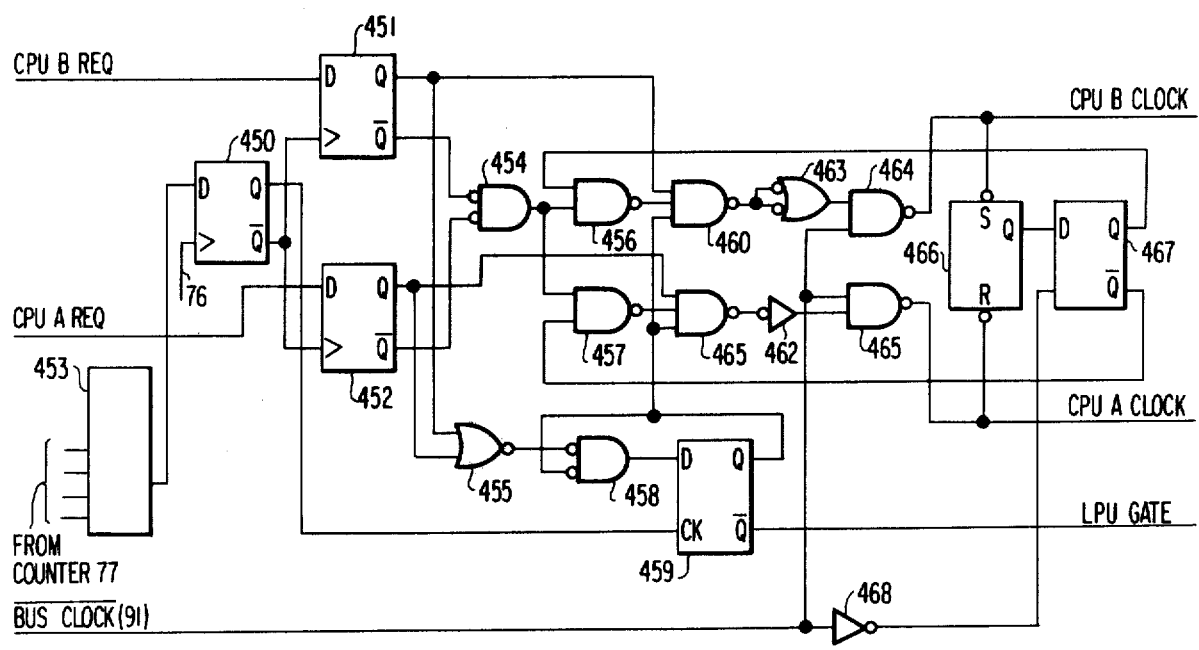

FIG. 6D illustrates the logic in the arbitrator designed to generate the CPU A or B clocks in response to request from either CPU (or from only one CPU if there is only one CPU). As will appear, every time a CPU CLOCK is generated, an LPU gate is also generated. Reference back to FIG. 5A illustrates that the LPU gate prevents the LPU which had last received the BUS GRANT from utilizing the BUS CLOCK for transmitting data to the arbitrator, and this is what enables the CPU to obtain that clock. At the same time, the arbitrator logic of FIG. 6D provides for sharing of CPU accesses to the bus on a 50—50 basis, that is, if both CPU's have a request pending, the access is given to the CPU which has not had the last access.

Referring now to FIG. 6D, the CPU request are input to flip-flops 451 and 452 (for CPU's B and A, respectively). CPU requests are sampled at an appropriate time in the cycle by clocking flip-flops 451 and 452 via the $\overline{Q}$ output of flip-flop 450. The $\overline{Q}$ outputs of these flip-flops are provided to AND gate 454, in inverted form. The output of AND gate 454 is an input to NAND gate 456 as well as NAND gate 457. The output of NAND gate 456 is one input to NAND gate 460 and the output of NAND gate 457 is one input to a NAND gate 461. Gates 460 and 461 also receive Q outputs of flip-flops 451 and 452, respectively. The output of NAND gate 461 is coupled, through inverter 462, to a NAND date 465. The output of NAND gate 460 is coupled through OR gate 463 to NAND gate 464. Gates 464 and 465 receive another input which is $\overline{BUS\ CLOCK}$. The output of NAND gate 464 serves to set flip-flop 466 and is the signal CPU B CLOCK. The output of NAND gate 465 serves to reset flip-flop 466 and is the CPU A CLOCK. The Q output of flip-flop 466 is the D input to a flip-flop 467 which is clocked by BUS CLOCK. The Q output of flip-flop 467 is the second input to NAND gate 456 and the Q output of flip-flop 467 is the second input to NAND gate 457. The Q outputs of flip-flops 451 and 452 are input to NOR gate 455 whose output is one input to an AND gate 458. The output of AND gate 458 is a D input to flip-flop 459 whose Q output is the other input to AND gate 458, as well as the third inputs to NAND gates 460 and 461. The $\overline{Q}$ output of flip-flop 459 is the LPU gate.

In operation, when a CPU generates a CPU request, it is latched into either flip-flop 451 or 452. On bus clocks, flip-flop 459 is clocked and if there is a CPU request pending, the Q output goes high and the $\overline{Q}$ output generates the LPU gate. If the last bus clock had been used as a CPU access, therefore, the flip-flop would not change state, and the LPU gate would not be produced. Thus, the CPU's as a group can only have one half of the bus resource. If the LPU gate is generated and if only one CPU request is pending, then the appropriate NAND 464 or 465 will generate the CPU CLOCK. At the same time, flip-flop 466 is set or reset to indicate which CPU gained the last access. The condition of flip-flop 466 is input to flip-flop 467 whose Q and $\overline{Q}$ outputs are fed back to NAND gates 456 and 457. If both CPU's have pending requests, then the output of AND gate 554 will cause the generation of a CPU clock for the CPU which did not last have access. When the CPU clock is generated, the $\overline{CPU\ REQUEST}$ signal will go high at the same time as the CPU transmitters are enabled. The arbitrator generates an ACCESS COMPLETE signal and provides it to the CPU in the same manner as the signal is generated with regard to a bus access from an LPU.

Interface Switching

As shown in FIG. 1A, each of the interface switches 18 is controlled from the CPU 17 over a bus 18'. Each of the interface switches 18 is coupled to an associated LPU over a bus 18''. Finally, as illustrated in FIG. 1A, an additional bus 18''' provides a data path between at least a plurality of the interface switches 18 and a spare driver 11. This arrangement provides for cost-effective redundancy if, for example, a particular line processor is to be taken out of service. This can be effected automatically under control of the CPU 17 if a spare line processor and interface driver 11 is available. To effect this automatic replacement of a line processor, the CPU 17 addresses a command to the interface switch associated with the LPU to be removed. Based on the command, the interface switch 18 changes state so that data received from its associated modem is, instead of being passed over a bus 18'' to its associated LPU, is instead placed upon the common bus 18'''. Interface driver 11 associated with the spare LPU, it will respond to the data placed on the common bus 18''' and pass the data to and from the spare LPU. Actual physical replacement of the removed LPU can be accomplished at any convenient later time. After replacement, the CPU 17 can reverse the operation so that the replaced LPU takes over the duties of its predecessor and the spare LPU is relieved of its functions. In this fashion, a single spare LPU can serve as a redundant backup for a plurality of other similar LPU's rather than having a redundant LPU provided for each operating LPU. Of course, a spare LPU is capable of serving as a redundant backup for only those LPU's which are identical to it. Different types of LPU's therefore, require different spare LPU's.

Thus, for example, as shown in FIG. 1, two of the LPU's 15 are backed up by a third LPU 15.

Figure 8A:
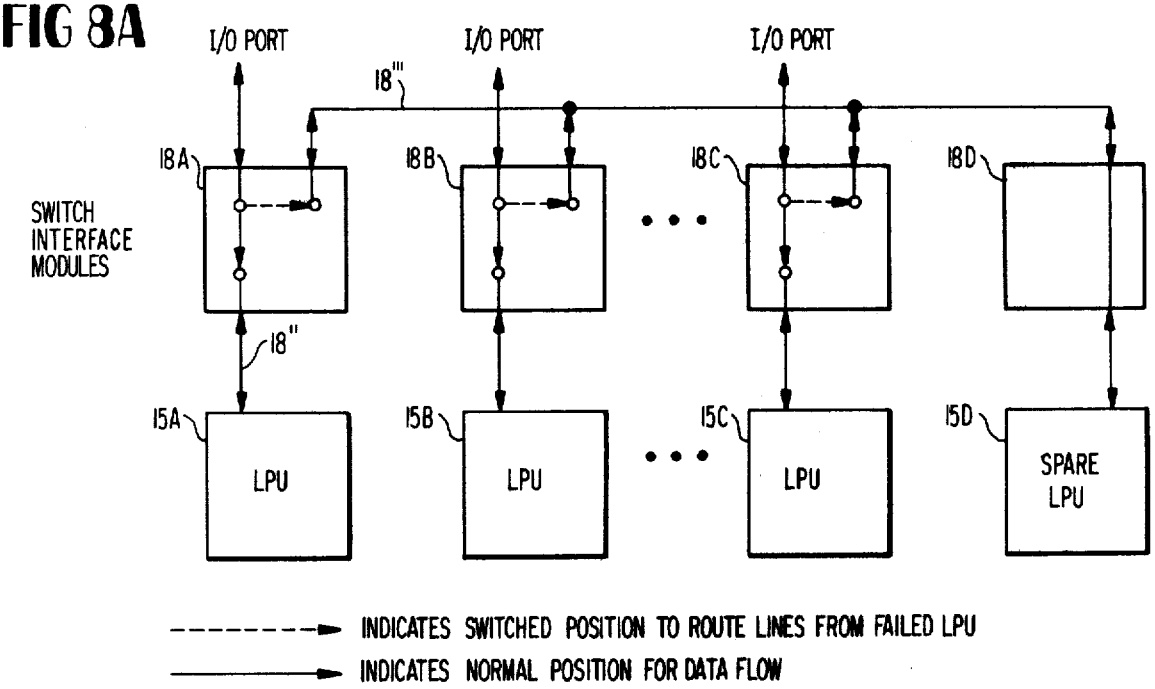
FIGS. 8A and 8B show in block diagram form the relationship between LPU's and interface switches and a schematic of the interface switch.

FIG. 8A details the operation in block diagram form. As shown there, three LPU's 15a, 15b and 15c are coupled through an associated switch interface 18a, 18b and 18c, through an I/O port to an associated modem. As spare LPU 15d is coupled through a spare interface driver 18d to the common data bus 18'''. Normally, the swith interfaces couple the modem to the LPU. However, the data received from a modem can, instead of being forwarded to the associated LPU over the bus 18'', can be provided to the common bus 18'''. Under those circumstances, the switch driver 18d is arranged to respond to the information on the common bus 18''' and provide such data to its associated or spare LPU 15d. In this fashion, for example, any of the LPU's 15a through 15c can be replaced by the spare LPU 15d under control of the CPU.

Figure 8B:
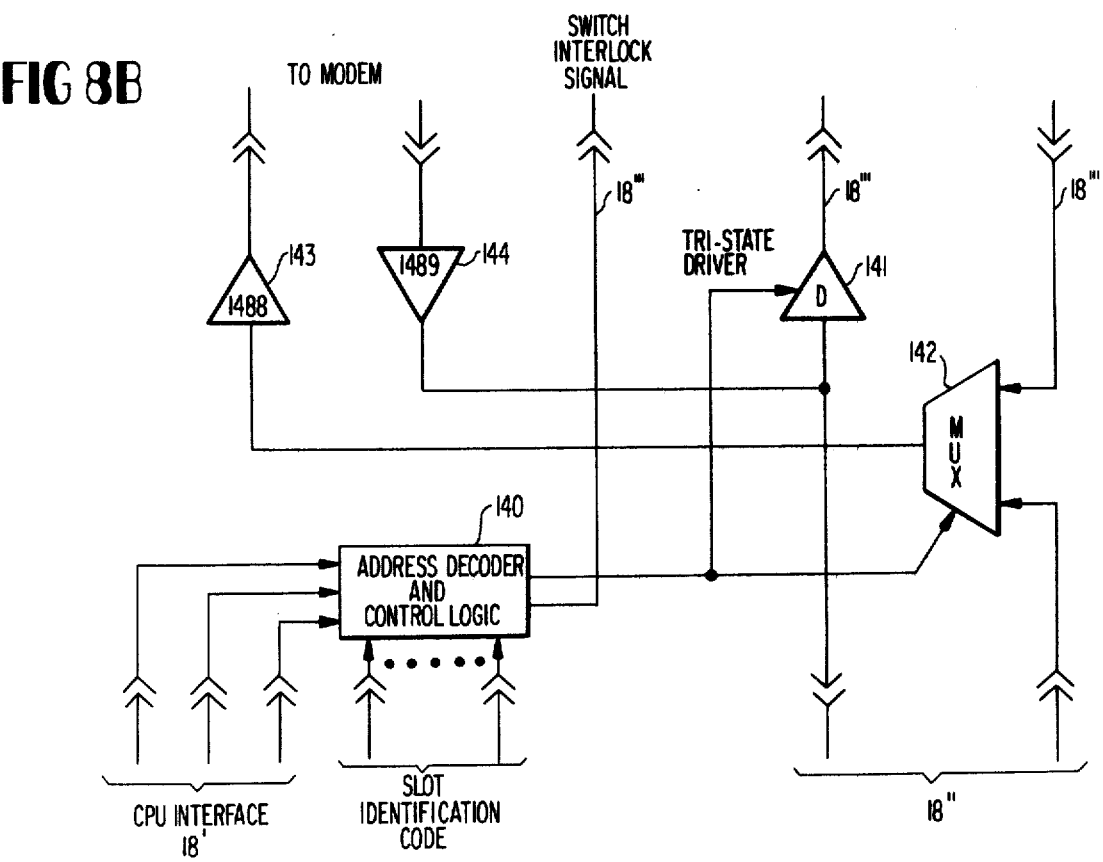

FIG. 8B is a block diagram of a typical switch interface 18. As shown in FIG. 8B, the switch interface 18 includes an address decoder and control logic 140 which receives inputs from the CPU interface bus 18' as well as a slot identification code, giving the switch interface 18 an identity. This is simply effected by locating a unique combination of jumpers at each slot providing a unique voltage combination as an input to a comparator which produces an output to latch in a message when it recognizes an identical address associated with the message. The decoder and control logic 140, in turn, controls a tri-state driver 141 and a multiplexer 142. The modem associated with the switch interface 18 is coupled over a pair of converters 143 and 144, which are provided for changing signal level between TTL and modem levels, for example. Under normal circumstances, the data received by the converter 144 is coupled directly to the associated LPU over the bus 18''. The driver 141 is disabled and the multiplexer 142 is configured so as to couple the LPU interface 18'' to the converter 143. However, the CPU 17 can address a command to the interface switch coupled over the interface bus 18'. When the address decoder and control logic 140 identifies the command as being addressed to the interface switch, two signals change state with the following effects.

In the first place, the driver 141 is enabled. This couples data from the modem, through converter 144 output into the common bus 18'''. In addition, the condition of the multiplexer 142 is altered so that it couples data from the common bus 18''' to the modem through the converter 143. Under these circumstances, while the LPU has available to it information from the converter 144, any information provided by the LPU through the bus 18'' will not pass the multiplexer 142.

Finally, the signal on the switch interlock conductor of the common bus 18''' is changed. This prevents any other switch interface from attempting to use the common bus 18'''.

Throughout this specification we have referred to modems as providing the data link to and from our inventive processor. The use of modems is, however, only exemplary, and those skilled in the art will realize that other data communication equipment (DCE) or data terminal equipment (DTE) could be used just as well depending on the circumstances.

Organization for Use

As thus far explained, the microprocessors (both LPU and CPU) each have available their own local memory, accessible to no other processor. Through the DAB and arbitrator, each microprocessor can also access common memory. Typically, the microprocessor address size is 16 bits, allowing access to any one of 65,536 memory locations, although the common memory will typically contain a greater range of memory locations. The total memory visibility of each processor can contain data, instructions, or any combination of the two. Typically, the local memory will be restricted to 4096 to 16384 memory locations, with each processor having access to common memory locations such that the total visibility at each processor is 65,536. As a result, so long as instructions being executed are in local memory, high speed operation typical of microprocessors is performed. Execution of instructions from common memory is also available, although with somewhat slower speed due to the need to contend for bus access to access the common memory. The common memory is used much more for data transfers than the execution of instructions stored there.

To allow any processor freedom to access a desired location in main memory, a page map mechanism is employed. The use of the page map is restricted to main memory accesses. It is not used on local memory accesses. When the processor address decoder 33 (FIG. 5C) determines that a remote access is necessary the 16 bit address is split into a high order portion which is used as the page address and a low order part which is termed the offset. The page address is used, at each processor, as an address into a page map memory table. Each location in the page map memory table is composed of a greater number of bits than the page address, and the contents of the location are concatenated with the offset to form a main memory address. For example, of the 16 bit microprocessor address, 5 bits may be used as the page map memory address to access one of 32 locations in the table. Each table location may have 9 bits, 7 bits of which are concatenated with the 11 offset bits to produce an 18 bit address, which can address one of 262,144 main memory locations. The eighth bit can be used as a write protect, to prevent writing in protected areas of main memory, and the ninth bit can be a parity bit. Writing the page map determines which areas of main memory will be accessible and typically the LPU's are prevented from rewriting their page maps except on initialization or under extraordinary circumstances. The CPU software can control the writing of the LPU page maps. Under these circumstances, every address intended for main memory will have a corresponding page map entry allowing for the production of the 18 bit address required.

Many locations in the large main memory may be accessed on infrequent occasions. To maintain a constant check on the validity of the information stored at these locations, the arbitrator includes a memory testing device which is implemented with a simple address counter and logic. The counter in the memory tester is incremented in operation and has the capacity to address every location in main memory. The memory tester is arranged so as to not interfere with the memory in those periods when memory is accessed. However, on BUS CLOCK cycles when no memory access is initiated, the tester operates. A gate detects the BUS CLOCK simultaneous with the absence of BUS ACTIVE. This indicates that the bus cycle, and hence a memory access cycle, is not used. At that time, the memory tester counter contents are used as an address to main memory, and a read cycle is initiated. The information read out is parity checked for validity. If valid, the counter is merely incremented and the tester awaits a further unused BUS CLOCK. A parity error results in an entry in a memory error register of the address at which the bad parity was detected. In this fashion, parity of the entire main memory is constantly checked without decreasing access to main memory required by any microprocessor.

Conventionally, real time inputs to a processor are handled on an interrupt basis. This serves to interrupt processor operation on an orderly basis so as to handle the real time situation. In situations where interrupts from multiple devices are possible, the conventional solution is to separately input them and use a hardware or software priority mechanism to ensure that the highest priority interrupts are handled first.

The inventive processor may have anywhere from a few to as many as 60 or more LPU's, each of which is capable of initiating an interrupt to the CPU. To provide that many separate interrupt lines and the necessary priority scheme would be awkward and expensive. Therefore, each arbitrator includes a FIFO memory to record interrupts from the LPU's. The nature of the FIFO results in a natural priority arrangement. An LPU interrupt results in entry of the LPU's ID into FIFO. The entry is made at the time at which the interrupt was generated so that interrupts are entered and handled on a first come, first served basis. Any entry into the FIFO generates an interrupt to the CPU and the CPU then reads the FIFO from the top, one entry at a time. Information transfers from LPU to FIFO in the arbitrator and from there to the CPU uses the same DAB described above. Thus, the interrupt mechanism need not be changed as the number of LPU's is increased or decreased.

In typical operation, the communication processor responds to real time events which are difficult, if not impossible, to duplicate in a maintenance or testing environment. More particularly, the information received over any communication line is random in time and content with respect to each of the other lines. While a software problem may leave evidence of its occurrence, it may be difficult or impossible to determine the cause. To aid in maintenance functions, the arbitrator also includes an address trap mechanism. This includes an address register in the arbitrator into which any main memory address can be loaded. A further register is loaded with data defining the action to be taken if access is attempted to the location whose address is in the address register. A decoder responds, when the bus carries an address corresponding to that in the register, to the type of access attempted and the contents of the further register to:
  (1) interrupt the CPU if a read access is made to the trap location; and/or
  (2) interrupt the CPU if a write access is made to the trap location; and, if desired,
  (3) prevent any memory access to the trap location for either (1) or (2). This will cause bus hang since the desired memory access will not, and cannot, be completed.

CPU software, then, can be used to make a record of information relative to the access to the trap location for later assistance in correcting errors that may exist. For example, if access is prevented, the resulting bus hang will cause a restart on the accessing LPU. The CPU can determine the identity of the restarted LPU as an aid in determining the source of any associated problem.

SUMMARY

To illustrate the manner in which the foregoing apparatus operates, lets assume that the processor is being employed as a concentrator. In such a configuration, a plurality of modems are coupled to low speed lines on which incoming data is received. One or more modems will, in turn, be coupled to relatively high speed lines upon which the processor will emit data in more concentrated form, usually at high speed. In its concentrated form, the output data from the processor can be coupled to long haul transmission facilities for efficient data transfer.

At the beginning of any period of time, the CPU in control assigns each of the line processors which are to have processing duties, a reserved area in common memory 10. Each line processor, in response to the data provided from the modem, will accumulate received data, usually a bit at a time. If a line processor is working with more than one line, the processor will be accumulating the data from each of its lines, in parallel. At a time when any one of these parallel accumulations reaches any selected size such as byte size, the processor will be in a position to transmit that byte over the demand assigned bus to the common memory resource at its assigned location. The line processor will have to contend for bus access with any other processor which is in a position to transmit its own byte to the common memory. Thus, a plurality of line processors are simultaneously contending for bus access; when access is achieved, the accessing processor monitors the acknowledgement, and only considers a data transfer complete when a proper acknowledgement is received. Subsequent to (or in some instances, simultaneously), the access and monitoring, the line processor will be accumulating data for the next byte to be transferred.

At the same time this activity is occurring, the CPU in control has also assigned the output task to another line processor, typically a high speed line processor. When a group of bytes has been accumulated at a memory area, the CPU in control will issue a command to the output line processor to retrieve the data and transmit it. Upon receipt of this command, the LPU will begin contending for access to the bus in order to retrieve the data at the specified location of the common memory. As each byte of data is retrieved it is transmitted by the LPU out to the modem controlled thereby, bit by bit.

Line processing functions, either receiving or transmitting, in addition to conversion of data from serial to parallel, and from modem levels to logic levels, will include parity checking and perhaps other conventional error correcting decoding, stripping out synchronization information such as stop bits, start bits and stuffed bits, if any. Since a microprocessor is performing these functions, additional intelligent type functions can be performed, for example, code conversion. The code conversion can be effected either at the input or output microprocessor. Since the CPU does not have any line responsibilities, its function can be relegated to system management, such as bus selections, monitoring for failed components, etc. Furthermore, since each of the CPU's and LPU's have access to the common memory or memories they can access that memory for, not only data transfers, but for program transfers, and even execute instructions stored in the common memory or transfer program routines, in block form to their local memory. This is a powerful advantage since infrequently used routines need not be stored in local memory at all. Furthermore, much of the personality of the LPU is software controlled. Thus, the LPU characteristics or functions can be varied under control of the CPU by loading software therein from remote memory. Note that the change is effected without requiring any mechanical changes. See "Communications Processors for Telenet's Third Generation Packet Switching Network" by Newport and Kaul in the 1977 IEEE EASCON RECORD, Pages 8-2A through 8-2L.

What is claimed is:

1. An information transfer system for transferring information between a common location and a plurality of independently operating data processors over a bi-directional bus operated in a demand assigned mode, said information transfer system including:

an information storage and retrieval device and an arbitrator at said common location, said arbitrator coupling said bi-directional bus to said information storage and retrieval device, said arbitrator including means for generating a control signal after all said independently operating processors, collectively, either has had, refused or does not require access, and also including clock means for generating a cyclic timing signal having two distinct portions, a plurality of bus control means, each associated with a different one of said plurality of independently operating data processors, each said bus control means including a control signal input and a control signal output, each said bus control means enabling access to said bi-directional bus by the associated data processor only on receipt of said control signal or a replica thereof, a clock bus coupled to said clock means for distributing said timing signal to a plurality of said bus control means, control signal distributing means coupled to said means for generating a control signal for presenting said control signal to be effective at a control signal input of only one of said bus control means, and coupling a control signal output of each of a plurality of said bus control means to be effective at a control signal input of other of said bus control means, each of said bus control means responsive to the receipt of a control signal or replica thereof at said control signal input for immediately coupling a replica of said control signal to the associated control signal output in the event access to said bus is not required, or if access to said bus is required, allowing access to said bi-directional bus subsequent to receipt of said control signal or replica thereof and synchronous with said timing signal for one of said distinctive portions and simultaneously with the beginning of said one distinctive portion coupling a replica of said control signal to an associated control signal output.

2. The apparatus of claim 1 in which each of said independently operating data processors include transmitting means and receiving means each coupled to said bidirectional bus, said bus control means enabling said transmitting means for the associated data processor for one distinctive portion of said timing signal and enabling said receiving means during another distinctive portion of said timing signal.

3. The apparatus of claim 2 in which said bus control means includes delay means for delaying enablement of said receiver means for a complete period of said timing signal after enablement of said transmitting means ceases.

4. The apparatus of claim 3 in which an arbitrator includes parity checking means for checking parity on information transferred thereto over said bi-directional bus or from said information storage and retrieval device, means in said arbitrator in the absence of a parity error for generating an access complete signal during said second distinctive portion of said timing signal, a further bus coupling said access complete signal to all said plurality of independently operating data processors.

5. The apparatus of claim 4 in which each of said bus control means includes gating means jointly responsive to said delay means and to said access complete signal for enabling said receiving means.

6. The apparatus of claim 5 in which said bus control means includes a bi-stable device set to a distinctive condition when the associated data processor requires access to said bus, and means for halting said data processor until said access is completed.

7. The apparatus of claim 6 in which said independently operating data processor includes parity checking means for checking parity of data received by said receiving means, said bus control means includes logic means responsive to operation of said gating means and to lack of parity error detected at said data processor if any data was received, for generating a signal to reset said bi-stable device and allow continued operation of said processor.

8. The apparatus of claim 2 in which each of said bus control means generates a bus active signal coupled to a further bus common to all said processors and to said arbitrator, which signal is synchronous with the timing signal portion during which an associated transmitting means is enabled, and, said arbitrator includes receiving means enabled at the conclusion of said first distinctive portion of said timing signal only in the presence of said bus active signal.

9. The apparatus of claim 2 in which each of said bus control means includes means for generating a complete signal either at the time of a bus access or in the event the associated data processor does not require access, a second further bus coupling complete signals from all said plurality of independently operating data processors to said arbitrator, said means for generating a control signal acting synchronously with said timing signal to generate a control signal each time a complete signal is produced at each of said plurality of independently operating data processors.

10. The apparatus of claim 9 in which said means for generating a control signal includes timing means for timing out a predetermined period, means to initiate said timing means each time said control signal is produced, and means responsive either to a complete signal from all said plurality of independently operating data processors or to completion by said timing means of said predetermined period for generating a further control signal synchronous with said timing signal.

11. The apparatus of claim 2 which includes a second bi-directional bus, and second control signal distributing means,
- each of said independently operating data processor including a transmitting and receiving means for each said bi-directional bus,
- selecting means for selecting a single one of said buses to which information may be coupled,
- said bus control means including a control signal input and output for each said bus,
- means responsive to said selecting means for coupling a control signal input and output corresponding to a selected bus to said bus control means and for coupling said control signal input corresponding to an unselected bus to the associated control signal output.

12. The apparatus of claim 11 which further includes:
- a second arbitrator in addition to said arbitrator, each operating on a different one of said two bi-directional buses, and
- a second information storage and retrieval device in addition to said information storage and retrieval device, each associated with corresponding ones of said arbitrators.

13. The apparatus of claim 12 in which each of said arbitrators generate and couple an end of cycle signal on control lines of their associated bi-directional buses to said independently operating data processors, such that each said data processor receives both said end of cycle signals,
- said selecting means including a pair of bi-stable devices each associated with a different one of said buses and responsive to a common selection signal for selecting the bi-directional bus to which said processor will be responsive, each of said bi-stable devices clocked by the corresponding end of cycle signal.

14. The apparatus of claim 1 which further includes an additional independently operating data processor with transmitting and receiving means coupled to said bi-directional bus,
- bus access means in said additional data processor for controlling access of said additional data processor to said bi-directional bus,
- said bus access means responsive to said timing signal and including bus request signal means for manifesting a request for bus access to said arbitrator,
- means in said arbitrator responsive to said bus request signal for granting said request including means for generating a processor clock signal and coupling said clock signal to said additional data processor and for simultaneously generating a gate signal,
- said control signal distributing means coupling said gate signal to all said plurality of independently operating data processors,
- said bus access means enabling said additional data processor transmitting means responsive to said processor clock signal,
- each of said bus control means including gating means responsive to said gate signal to inhibit receipt of said timing signal, whereby an independently operating data processor last receiving said control signal is prevented from accessing said bus means until termination of said gate signal.

15. The apparatus of claim 14 in which said bus access means includes delay means for delaying enablement of said receiving means for a complete cycle of said timing signal after enablement of said transmitting means ceases.

16. The apparatus of claim 1 in which each of said independently operating data processors include a printed circuit card each mounted in a different card slot in a chassis,
- each said card including plural control signal inputs and further including a card present signal generator, a card present signal output and a plurality of card present signal inputs, a priority detector coupled to all said card present signal inputs and a multiplexer coupled to all said control signal inputs and controlled by said priority detector,
- said control signal distributing means including conductors, each spanning said plurality of slots, each said conductor running from either a card present signal output or a control signal output and connected to card present or control signal inputs of said plurality of cards,
- whereby said priority detector locates an adjacent card producing a card present signal and controls said multiplexer to pass a control signal from only said adjacent card.

17. An information transfer system for transferring information between a group of at least three independently operating asynchronous information processing means and a common information storage and retrieval device comprising:
- information bus means including plural bi-directional data lines, plural address lines, and plural bus control lines,
- said group of independently operating information processing means each coupled to said plural bi-directional data and address lines and at least some of said bus control lines,
- arbitrator means coupling said common information storage and retrieval device to said bi-directional data and address lines,
- said arbitrator means including bus clock generating means generating a substantially periodic signal having two distinctive portions, said bus clock means coupled through one of said bus control lines to a plurality of said independently operating information processing means, and further including a bus grant signal generating means for producing a bus grant signal,
- each of said plurality of independently operating information processing means including,
- information transmitting/receiving means coupled to said bi-directional data and address lines of said information bus means, and control means for selectively enabling said information transmitting/receiving means to transmit or receive information from said bus,
- said control means coupled to at least some of said bus control lines for enabling said transmitting means to transmit on said information bus means during one distinctive portion of said periodic signal but only in response to receipt of said bus grant signal prior to said one distinctive portion of said periodic signal and, substantially simultaneous with initiation of said transmission, to output a replica of said bus grant signal if the associated information processing means requires access to said information storage and retrieval device, said control means responding to receipt of a bus grant signal to substantially simultaneously therewith output a replica of said bus grant signal if the associated information processing means does not require access to said information storage and retrieval device, said bus control lines of said bus means including a means coupling said bus grant signal to be effective at only one of said plurality of independently operating information processing means, and further including additional means coupling a bus grant output of said one independently operating information processing means to be effective at only a control means of another independently operating information processing means.

18. The apparatus of claim 17 wherein said information bus means includes a first and second bus, each with said plurality of data, address and control lines, each of said independently operating information processing means including:

first and second transmitting/receiving means connected respectively to said first and second bus, selecting means for enabling one of said first or second transmitting/receiving means said selecting means providing a path from a control line input corresponding to a selected bus to said control means.

19. The apparatus of claim 18 in which said selecting means provides a path from a control signal input to a control signal output corresponding to an unselected bus.

20. The apparatus of claim 17 wherein each of said control means includes a bus grant input and a bus grant output, and said plural bus control lines include a line coupling a bus grant input of a control means other than a control control means associated with said one information processing means.

21. The apparatus of claim 13 wherein said control means enables said receiving means only during said other distinctive portion of said signal.

22. The apparatus of claim 17 wherein said control means includes:

a bi-stable device set to a distinctive condition if the associated information processing means requires access to said information storage and retrieval device, a second bi-stable device clocked by an edge of said distinctive portion of said periodic signal and set in response to the conjunction of a bus grant signal and a distinctive condition of said bi-stable device transmit enable means and means for generating a bus grant signal both operative in response to setting of said second bi-stable device, gating means coupled to said bi-stable device and partially enabled when said bi-stable device is not in said distinctive condition, said means for generating a bus grant signal coupled to said gating means for generating said bus grant signal substantially simultaneous with receipt of a bus grant signal when said bi-stable device is not in said distinctive condition.

23. The apparatus of claim 22 in which said control means further includes:

timing means initiated by said second bi-stable device when set to count a predetermined number of edges of said periodic signal for resetting said second bi-stable device, strobe generating means for enabling said receiving means in response to said timing means and in response to information coupled over another of said control lines.

24. The apparatus of claim 23 in which said data processor further includes parity checking means for checking information strobed in by said strobe generating means, second gating means responsive to said strobe generating means and to said parity checking means for resetting said bi-stable device in the absence of a parity error detected after generation of said strobe.

25. The apparatus of claim 23 in which said arbitrator includes means for generating said information coupled over said another of said control lines including:

checking means for checking information transferred over said information bus means for delivering a one signal in the absence of an error and another signal in the presence of an error.

26. The apparatus of claim 17 in which said control means includes means for generating a complete signal either when said associated processor has had access to said information bus means or does not require access to said information bus means, a one of said bus control lines coupled to each said complete signal, and said bus grant signal generating means produces a bus grant signal when said complete signal is produced by each of said processors.

27. The apparatus of claim 26 wherein said means for generating a complete signal inhibits production of said complete signal on receipt of said bus grant signal.

28. The apparatus of claim 26 in which each said microprocessor includes a local memory, address decoder means for decoding an address and providing an output if said decoded address refers to a location outside of said local memory, and means for manifesting a request for access to said demand assigned information bus means in response to said address decoder output.

29. A method of distributing access to a common bus among a plurality of independently operating data processors each of which can both transmit to and receive from said common bus for the purpose of allowing said data processors to access a common memory device coupled to said bus, the method comprising the steps of:

(1) distributing a cyclic bus timing signal and allowing transmission from any data processor only during a first portion of said timing signal and allowing reception by any said data processor during another portion of said timing signal, exclusive of said first portion (2) generating a control signal when said processors collectively have had, refused or do not require access and coupling said signal to only one of said data processors, (3) transmitting from any processor in response to receipt of said control signal, said transmission synchronous with said first distinctive portion and simultaneous with said transmission coupling said control signal to a control signal output, and (4) coupling said control signal from a control signal output of one data processor to another in a predetermined order.

30. The method of claim 29 in which reception from said common bus is enabled at any data processor that has transmitted but only in a second distinctive portion following a first distinctive portion which itself follows the first distinctive portion during which transmission occurred.

31. The method of claim 29 in which, at any processor not in condition to transmit on reception of said control signal, substituting the following for step (3):

immediately coupling said control signal to said control signal output.

32. The method of claim 29 in which, in addition to said plurality of data processors, there is a further data processor and in which access is distributed to said further data processor only in response to specific requests therefor and then on at most every other cycle of said timing signal.

33. The method of claim 29 in which said step (3) is limited at any processor to a single transmission in any cycle of said timing signal and a transmitting processor is prevented from again transmitting until each other processor has had, refused or does not require access.

34. A communication processor including common memory means,
- a bidirectional demand assigned information bus means providing access to said memory means,
- a plurality of at least three independently operating asynchronous microprocessors each coupled to said demand assigned information bus means,
- arbitrator means and a plurality of bus access means each of said bus access means associated with a different one of said microprocessor for controlling access to said bidirectional demand assigned information bus means by said microprocessors jointly with all other bus access means and said arbitrator means,
- memory bus means coupled between said arbitrator and said memory means, said arbitrator means coupled to said bidirectional demand assigned information bus means and to said memory bus means for transferring information between both said bus means,
- a plurality of modems, each coupled to a different one of said microprocessors for the transfer of information therebetween and
- an executive microprocessor coupled to said bidirectional demand assigned information bus means and to said arbitrator,
- a plurality of interface switching means, each interface switching means coupling a modem to a different one of said plurality of independently operating microprocessors,
- common interface switching bus,
- a group of interface switching means also coupled to said common interface switching bus, logic means in each of said group of interface switching means, and means coupling said logic means to said executive microprocessor, said logic means responsive to controls from said executive microprocessor for coupling information from a modem onto said interface switching bus.

35. The apparatus of claim 34 in which each said microprocessor includes a local memory, address decoder means for decoding an address and providing an output if said decoded address refers to a location outside of said local memory, and means for manifesting a request for access to said demand assigned information bus means in response to said address decoder output.

36. The apparatus of claim 34 wherein said information bus means includes first and second identical information buses and in which each of said microprocessors and said arbitrator each include means responsive to both said buses and selecting means for selecting a one of said buses which said processor or arbitrator will respond to.

37. The apparatus of claim 36 which further includes a second arbitrator means, a second common memory means, a second memory bus means coupled to said second arbitrator means and a second executive microprocessor coupled to both said first and second information buses and to both said arbitrators.

38. The apparatus of claim 34 in which said logic means is responsive to controls from said executive microprocessor for coupling information from said common interface switching bus to an associated microprocessor.

39. An information transfer system for transferring information between a common location and a plurality of at least three independently operating data processors including a bidirectional data and address bus operating in a demand assigned mode, comprising:

bus grant signal generating means at said common location for generating a bus grant signal and for coupling said bus grant signal to a bus grant input of a bus access logic means associated with a single one of said independently operating data processors, a bus access logic means associated with each of said independently operating data processors for allowing said associated data processor access to said bidirectional data and address bus in response to receipt of said bus grant signal if said associated processor previously requested access to said data and address bus, each said bus access logic means including a bus grant input and a bus grant output, a control bus, means coupling said control bus to each said bus access logic means for distribution of a clocking signal to each bus access logic means, said control bus including a segmented bus grant conductor with different segments connected from a bus grant output of a bus access logic means to a bus grant input of another bus access logic means, so that each bus grant input is coupled to a bus grant output of a different bus access logic means except for that bus grant input coupled to said bus grant signal generating means, each said bus access logic means including a complete signal means for producing a distinctive output at an output terminal only when an associated data processor requires access to said data and address bus and for producing a different output at said terminal each time said associated data processor has had access to said data and address bus or does not require such access, said control bus including first means responsive to said output terminal of each said complete signal means to produce a first output when each said complete signal means does not produce said distinctive output, said bus grant signal generating means including logic means responsive to said first output of said first means for generating a bus grant signal each time said first means produces said first output.

40. The apparatus of claim 39 in which said bus grant generating means includes timer means responsive to each said bus grant signal to initiate a timing period, and in which said logic means responds to expiration of said timing period to generate said bus grant signal.

41. The apparatus of claim 39 which further includes bus clock generating means for producing a clocking signal coupled to said control bus and therethrough to each said bus access logic means, and wherein each said bus access logic means includes second means responsive to receipt of a bus grant signal to enable transmitters of said associated independently operating data processor, synchronous with said clocking signal and, to simultaneously therewith, output a replica of said bus grant signal if said associated independently operating data processor then requires access to said data and control bus.

42. The apparatus of claim 39 which further includes:
bus clock generating means for producing a clocking signal coupled to said control bus and therethrough to each said bus access logic means, and, wherein each said bus access logic means includes third means responsive to receipt of a bus grant signal to, substantially simultaneously therewith, output a replica of said bus grant signal in the event said associated independently operating data processor does not then require access to said address and data bus.

43. The apparatus of claim 39 which further includes bus clock generating means for producing a clocking signal with rising and falling edges, coupled to said control bus and therethrough simultaneously to each said bus access logic means,
each said bus access logic means includes timing means to respond to said bus grant signal only on a predetermined transition of said clocking signal.

* * * * *

UNITED STATES PATENT AND TRADEMARK OFFICE
CERTIFICATE OF CORRECTION

PATENT NO. : 4,363,094
DATED : December 7, 1982
INVENTOR(S) : Kaul et al

It is certified that error appears in the above—identified patent and that said Letters Patent is hereby corrected as shown below:

On the title page item [73] should read:

Assignee:--M/A-COM DCC, Inc.,
Germantown, Md.

and

Telenet Communications Corp.,
Washington, D.C. --.

Signed and Sealed this

Twenty-ninth Day of November 1983

[SEAL]

Attest:

GERALD J. MOSSINGHOFF

Attesting Officer    Commissioner of Patents and Trademarks